(12) United States Patent
Kelly et al.

(10) Patent No.: US 12,399,390 B2
(45) Date of Patent: Aug. 26, 2025

(54) PHOTONIC INTEGRATED CIRCUIT, OPTO-ELECTRONIC SYSTEM AND METHOD

(71) Applicant: EFFECT Photonics B.V., Eindhoven (NL)

(72) Inventors: Niall Patrick Kelly, Eindhoven (NL); Irina Kulkova, Eindhoven (NL); Tommaso Lunghi, Eindhoven (NL)

(73) Assignee: EFFECT PHOTONICS B.V., Eindhoven (NL)

( * ) Notice: Subject to any disclaimer, the term of this patent is extended or adjusted under 35 U.S.C. 154(b) by 265 days.

(21) Appl. No.: 18/340,087

(22) Filed: Jun. 23, 2023

(65) Prior Publication Data

US 2023/0418091 A1 Dec. 28, 2023

(30) Foreign Application Priority Data

Jun. 24, 2022 (EP) .................................... 22181072

(51) Int. Cl.
*G02F 1/01* (2006.01)
(52) U.S. Cl.
CPC ................... *G02F 1/0142* (2021.01)
(58) Field of Classification Search
CPC ................ G02B 6/14; G02F 1/0142
See application file for complete search history.

(56) References Cited

U.S. PATENT DOCUMENTS

2013/0156361 A1 6/2013 Kojima et al.
2021/0063302 A1 3/2021 Swanson

FOREIGN PATENT DOCUMENTS

TW 202136834 A 10/2021

OTHER PUBLICATIONS

Taiwanese Office Action mailed Feb. 19, 2024 for family member Application No. 112123592.
Yuan, W., Mode-evolution-based polarization rotator-splitter design via simple fabrication process, Optics Express, Apr. 23, 2012, pp. 10163-10169, vol. 20, No. 9, XP93003457, DOI: 10.1364/OE.20.010163, OSA.
Ito, M., Mode-Evolution-based Symmetrical Polarization Splitter-Rotator on Monolithic InP Platform, 2021 European Conference on Optical Communication (ECOC), Sep. 13, 2021, pp. 1-3, 978-1-6654-3868-1, XP034027433, DOI: 10.1109/ECOC52684.2021.9606038, IEEE.
Elfiqi, A., Robust InP/InGaAsP Polarization Rotator Based on Mode Evolution, IEEE Photonics Technology Letters, Jan. 15, 2022, pp. 109-112, vol. 34, No. 2, XP093003659, IEEE.

*Primary Examiner* — Chad H Smith
(74) *Attorney, Agent, or Firm* — Hudak, Shunk & Farine Co. LPA

(57) ABSTRACT

A PIC that includes an InP-based polarization rotator having an improved design that enables at least one of an improved performance and an improved yield of the PIC due to at least one of reduced variations in critical dimensions of the InP-based polarization rotator and reduced overlay errors during fabrication of the InP-based polarization rotator of the PIC. An opto-electronic system including said PIC. A method of fabricating the PIC that includes the InP-based polarization rotator having the improved design.

15 Claims, 11 Drawing Sheets

201

202

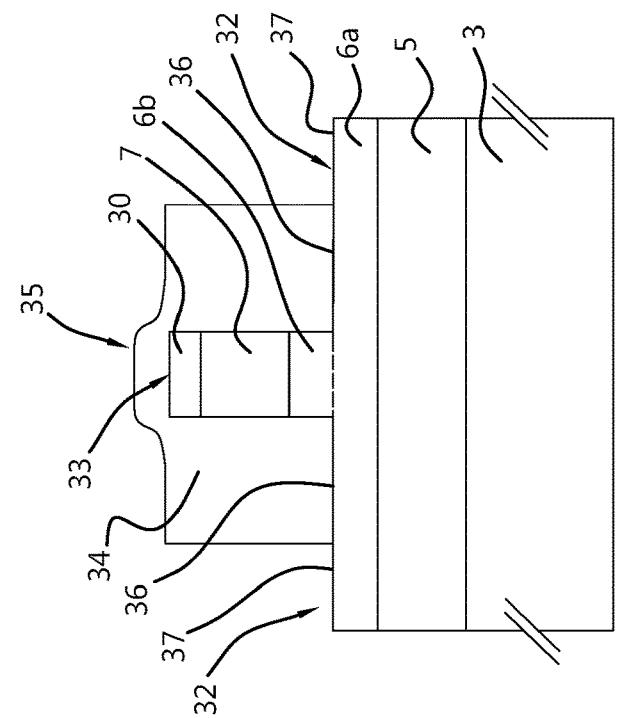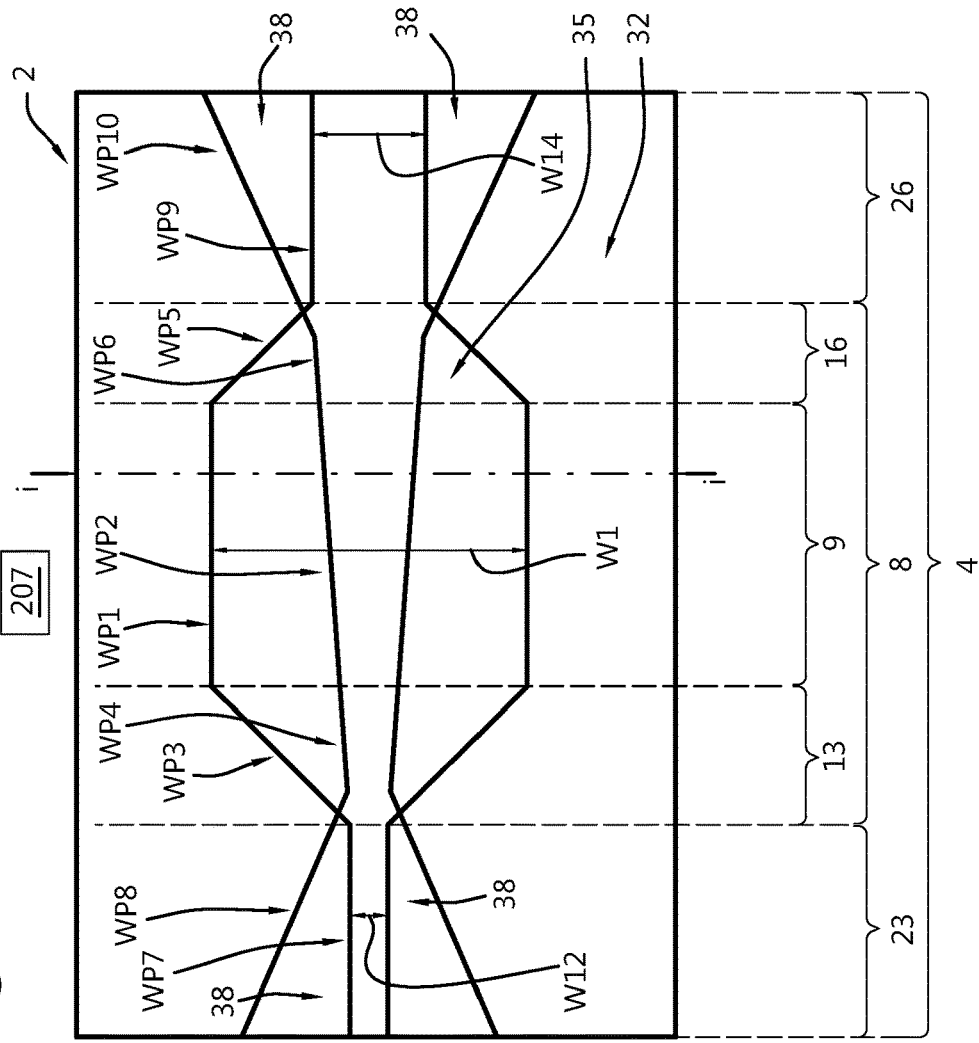
Fig. 7H
Fig. 7I

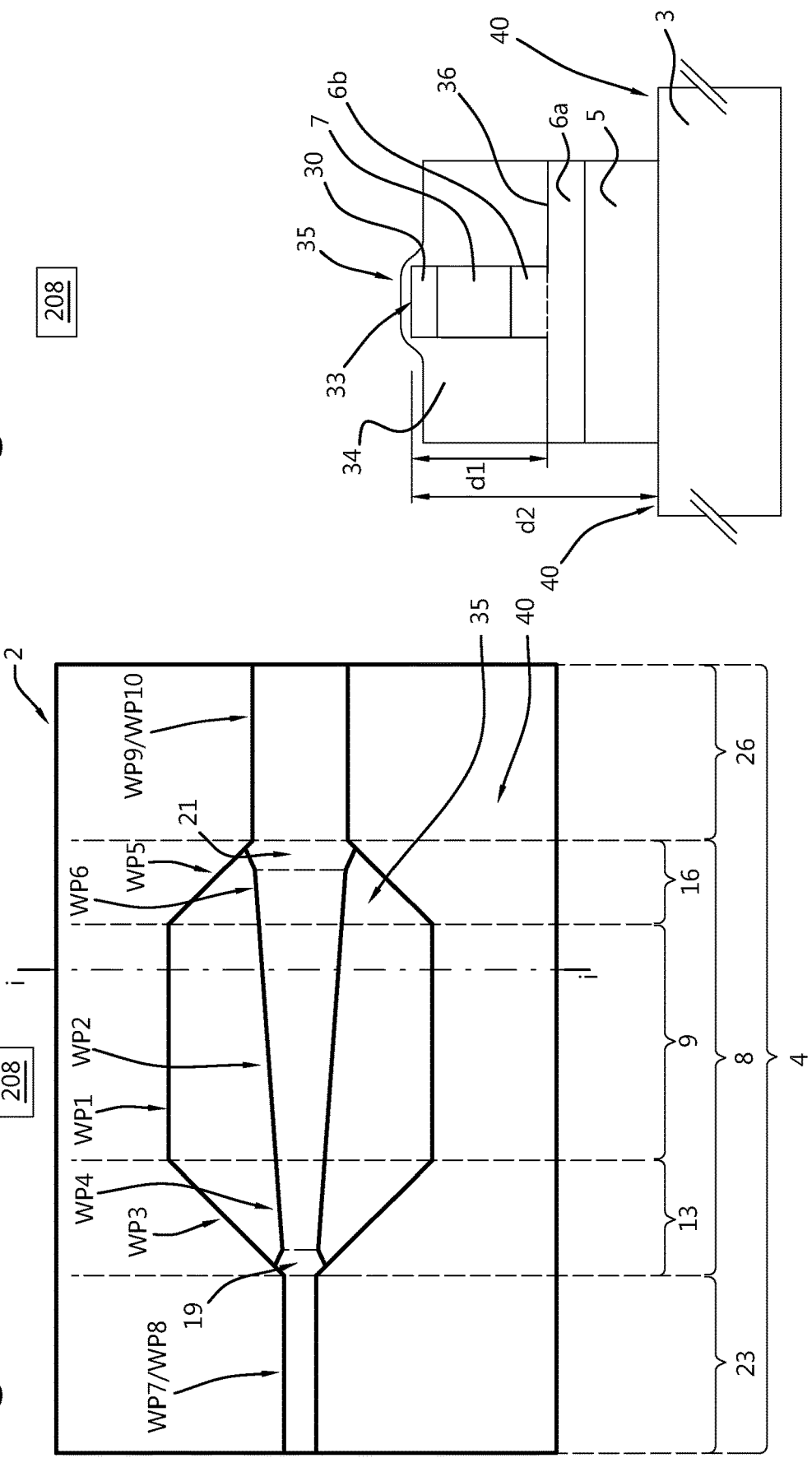

PHOTONIC INTEGRATED CIRCUIT, OPTO-ELECTRONIC SYSTEM AND METHOD

FIELD OF THE INVENTION

The present invention relates to a photonic integrated circuit (PIC) that can be used for example, but not exclusively, for telecommunication applications, Light Detection and Ranging (LIDAR) or sensor applications. The invention further relates to an opto-electronic system comprising said PIC. The invention further relates to a method of fabricating said PIC.

BACKGROUND OF THE INVENTION

PICs that can be applied for example, but not exclusively, in the field of optical telecommunication applications, LIDAR or sensor applications are becoming increasingly complex because of the increasing number of optical and/or electrical functions that are integrated on a single die that preferably has a footprint that is as small as possible.

An example of increasingly complex PICs is a PIC that can be used for coherent reception. It is known that coherent transmission involves encoding of information on two optical carriers by modulating their amplitude and phase. Two polarizations, i.e. transverse magnetic (TM) and transverse electric (TE), are commonly used to prevent said optical carriers from interfering with each other as they propagate along a same optical pathway that can be formed by for example an optical fiber or an integrated optical waveguide. Separation of TM and TE modes in a received optical signal is required for recovering the encoded information.

The most versatile technology platform for PICs, especially for optical telecommunication applications, uses wafers comprising InP-based semiconductor materials. InP-based technology enables monolithic integration of both active components such as for example light-generating and/or light-absorbing optical devices, and passive components such as for example light-guiding and/or light-switching optical devices, in one PIC on a single die.

It is known that most InP-based PICs are optimized for handling TE modes due to the confined nature of quantum wells. Therefore, in the case of for example coherent reception, it is common practice to split TM and TE modes and subsequently rotate or convert TM modes into TE modes. A polarization splitter is commonly used for splitting the TM and TE modes, and a polarization rotator is commonly used for subsequently rotating or converting TM modes into TE modes.

A known disadvantage of highly complex PICs, in particular those comprising at least one of an InP-based polarization splitter and an InP-based polarization rotator is that it is very challenging to achieve suitable chip yields because of the high fabrication complexity and sensitivity of the afore-mentioned components and the fact that CMOS levels of process control are not yet widely available for InP-based platforms. Therefore, there is a need for providing a PIC comprising an InP-based polarization rotator enabling at least one of an improved performance and an improved yield of the PIC due to an improved design of the InP-based polarization rotator. In addition, there is a need for providing an opto-electronic system comprising such a PIC. There is also a need for providing a method of fabricating a PIC according to the present invention.

SUMMARY OF THE INVENTION

It is an object of the present invention to provide a PIC comprising an InP-based polarization rotator that has an improved design that can be used for example, but not exclusively, for telecommunication applications, LIDAR or sensor applications, pre-empting or at least reducing at least one of the above-mentioned and/or other disadvantages associated with PICs comprising an InP-based polarization rotator known in the art.

It is also an object of the present invention to provide an opto-electronic system that can be used for example, but not exclusively, for telecommunication applications, LIDAR or sensor applications comprising a PIC according to the invention.

It is another object of the present invention to provide a method of fabricating a PIC according to the invention.

Aspects of the present invention are set out in the accompanying independent and dependent claims. Features from the dependent claims may be combined with features from the independent claim as appropriate and not merely as explicitly set out in the claims. Furthermore, all features may be replaced with other technically equivalent features.

At least one of the above-mentioned objects is achieved by a PIC comprising an InP-based polarization rotator that has a support substrate, the InP-based polarization rotator comprising an elongated InP-based optical waveguide that comprises:

a first InP-based cladding layer that is at least a part of the support substrate or an epitaxial InP-based layer that is arranged to at least partially cover the support substrate;

an InP-based core layer that is arranged to cover the first InP-based cladding layer; and a second InP-based cladding layer that is arranged to at least partially cover the InP-based core layer;

wherein the elongated InP-based optical waveguide is configured and arranged to have:

a first waveguide section that comprises:

a first portion that has a first end part and a second end part, wherein:

at least the first InP-based cladding layer and a first part of the InP-based core layer that is arranged in contact with the first InP-based cladding layer have a first width profile, WP1, as seen in a direction transverse to the elongated InP-based optical waveguide and parallel to the support substrate, the first width profile, WP1, having a first value, W1, that is constant;

the second InP-based cladding layer or the second InP-based cladding layer and a second part of the InP-based core layer that is arranged in contact with both the first part of the InP-based core layer and the second InP-based cladding layer have a second width profile, WP2, as seen in the direction transverse to the elongated InP-based optical waveguide and parallel to the support substrate, the second width profile, WP2, having:

a second value, W2, at the first end part of the first portion, the second value, W2 being smaller than the first value, W1, of the first width profile, WP1; and a third value, W3, at the second end part of the first portion, the third value, W3, being larger than the second value, W2, and smaller than the first value, W1, of the first width profile, WP1; and the first width profile, WP1, and the second width profile, WP2, are configured and arranged to provide the first portion with a hybridization region in which the elongated InP-based optical waveguide has effective refractive index values along a hybridization length, Lh, as seen in a direction parallel to the elongated InP-based optical waveguide, said effective refractive index values enabling a conversion of a lower order TM mode into a higher order TE mode in the hybridization region with a mode conversion loss of at most −10 dB;

a second portion having a third end part and a fourth end part that is arranged in optical connection with the first end part of said first portion, wherein:
  at least the first InP-based cladding layer and said first part of the InP-based core layer have a third width profile, WP3, as seen in the direction transverse to the elongated InP-based optical waveguide and parallel to the support substrate, the third width profile, W3, having:
    a fourth value, W4, at the third end part of the second portion, the fourth value, W4, being smaller than the first value, W1, of the first width profile, WP1, in the first portion; and
    a fifth value, W5, at the fourth end part of the second portion, the fifth value, W5, being equal to the first value, W1, of the first width profile, WP1, in the first portion; and
  the second InP-based cladding layer or the second InP-based cladding layer and said second part of the InP-based core layer have a fourth width profile, WP4, as seen in the direction transverse to the elongated InP-based optical waveguide and parallel to the support substrate, the fourth width profile, WP4, having:
    a sixth value, W6, at the third end part of the second portion, the sixth value, W6, being equal to the fourth value, W4, of the third width profile, WP3; and
    a seventh value, W7, at the fourth end part of the second portion, the seventh value, W7, being equal to the second value, W2, of the second width profile, WP2, in the first portion; and a third portion having a fifth end part that is arranged in optical connection with the second end part of said first portion, and a sixth end part, wherein:
  at least the first InP-based cladding layer and said first part of the InP-based core layer have a fifth width profile, WP5, as seen in the direction transverse to the elongated InP-based optical waveguide and parallel to the support substrate, the fifth width profile, WP5, having:
    an eighth value, W8, at the fifth end part of the third portion, the eighth value, W8, being equal to the first value, W1, of the first width profile, WP1, in the first portion; and
    a ninth value, W9, at the sixth end part of the third portion, the ninth value, W9, being smaller than the eighth value, W8, and larger than the fourth value, W4, of the third width profile, WP3, in the second portion; and
  the second InP-based cladding layer or the second InP-based cladding layer and said second part of the InP-based core layer have a sixth width profile, WP6, as seen in the direction transverse to the elongated InP-based optical waveguide and parallel to the support substrate, the sixth width profile, WP6, having:
    a tenth value, W10, at the fifth end part of the third portion, the tenth value, W10, being equal to the third value, W3, of the second width profile, WP2, in the first portion; and
    an eleventh value, W11, at the sixth end part of the third portion, the eleventh value, W11, being equal to the ninth value, W9, of the fifth width profile, WP5;

a second waveguide section that comprises a seventh end part, an eighth end part that is arranged in optical connection with the third end part of the second portion of the first waveguide section, and a first cross-section that is symmetrical as seen in a direction transverse to both the elongated InP-based optical waveguide and the support substrate, the first cross-section allowing the second waveguide section to support at least one of TM0, TE0, TM1 and TE1 modes; and a third waveguide section that comprises a ninth end part that is arranged in optical connection with the sixth end part of the third portion of the first waveguide section, a tenth end part, and a second cross-section that is symmetrical as seen in the direction transverse to both the elongated InP-based optical waveguide and the support substrate, the second cross-section allowing the third waveguide section to support at least one of TM0, TE0, TM1 and TE1 modes. The InP-based polarization rotator of said PIC is based on the concept that the first waveguide section of the elongated InP-based optical waveguide of the polarization rotator has an asymmetrical cross-section as seen in a direction transverse to both the elongated InP-based optical waveguide and the support substrate. Such a waveguide section is commonly referred to as a rib waveguide section. As a result of the arrangement and configuration of the width profiles WP1-WP6, the spatial asymmetry between the first InP-based cladding layer and the second InP-based cladding layer in the first waveguide section of the elongated InP-based optical waveguide enables the first portion of the first waveguide section to comprise a hybridization region that has a hybridization length, Lh, in which the effective refractive indices of respectively the lower order TM mode, e.g. the fundamental TM mode (TM0), and the higher order TE mode, e.g. TE1, are similar or as similar as possible. As a result, upon propagation of the lower order TM mode across the first waveguide section towards the third waveguide section, conversion of the lower order TM mode, e.g. TM0, into the higher order TE mode, e.g. TE1, can be achieved in the hybridization region.

It is noted that, depending on the specific configuration of the InP-based polarization rotator, it is also possible that an adiabatic transition from a lower order TE mode, e.g. the fundamental TE mode (TE0), into a converted higher order TM mode, e.g. TM1, can be achieved in the hybridization region in the first portion of the first waveguide section of the elongated InP-based optical waveguide of the InP-based polarization rotator of the PIC according to the invention. In view of the above-mentioned observation that most InP-based PICs are optimized for handling TE modes due to the confined nature of quantum wells, it is noted that although conversion or rotation of a lower order TE mode into a higher order TM mode also falls within the scope of the present invention, for the sake of simplicity, the discussion regarding the InP-based polarization rotator of the PIC will only be concerned with rotation or conversion of a lower order TM mode into a higher order TE mode, e.g. TM0 into TE1.

The PIC according to the invention comprises an InP-based polarization rotator that has a support substrate and the InP-based polarization rotator comprises an elongated InP-based optical waveguide that comprises:
- a first InP-based cladding layer that is at least a part of the support substrate or an epitaxial InP-based layer that is arranged to at least partially cover the support substrate;
- an InP-based core layer that is arranged to cover the first InP-based cladding layer; and
- a second InP-based cladding layer that is arranged to at least partially cover the InP-based core layer.

The elongated InP-based optical waveguide is configured and arranged to have:
- a first waveguide section that comprises:
  - a first portion that has a first end part and a second end part, wherein:
    - at least the first InP-based cladding layer and a first part of the InP-based core layer that is arranged in contact with the first InP-based cladding layer have a first width profile, WP1, as seen in a direction transverse to the elongated InP-based optical waveguide and parallel to the support substrate, the first width profile, WP1, having a first value, W1, that is constant;
    - the second InP-based cladding layer or the second InP-based cladding layer and a second part of the InP-based core layer that is arranged in contact with both the first part of the InP-based core layer and the second InP-based cladding layer have a second width profile, WP2, as seen in the direction transverse to the elongated InP-based optical waveguide and parallel to the support substrate, the second width profile, WP2, having:
      - a second value, W2, at the first end part of the first portion, the second value, W2 being smaller than the first value, W1, of the first width profile, WP1; and
      - a third value, W3, at the second end part of the first portion, the third value, W3, being larger than the second value, W2, and smaller than the first value, W1, of the first width profile, WP1.

The first width profile, WP1, and the second width profile, WP2, are configured and arranged to provide the first portion with a hybridization region in which the elongated InP-based optical waveguide has effective refractive index values along a hybridization length, Lh, as seen in a direction parallel to the elongated InP-based optical waveguide. Said effective refractive index values enable a conversion of a lower order TM mode into a higher order TE mode in the hybridization region with a mode conversion loss of at most −10 dB.

It is noted that control of the hybridization length, Lh, is important because if the hybridization length, Lh, is too short, the lower order TM mode will not have time to fully convert into a converted higher order TE mode. Conversely, if the hybridization length, Lh, is too long, the converted higher order TE mode can start to convert back into the lower order TM mode before the end of the hybridization region.

At some point in the hybridization region, the effective refractive index of the elongated InP-based optical waveguide has a value allowing the mode conversion loss to have a minimum value. At this so-called crossing point in the hybridization region there is a maximum in the conversion of the lower order TM mode into the converted higher order TE mode. Ideally, the crossing point is centered in the hybridization region, i.e. midway the hybridization length, Lh.

In a first exemplary embodiment of the PIC according to the invention, wherein the second width, W2, of the second width profile, WP2, can have a value of 2.75 μm, the third width, W3, of the second width profile, WP2, can have a value of 2.85 μm, and the first width, W1, of the first width profile, WP1, can have a value of at least 8 μm, a shift of the hybridization region along the first portion of the first waveguide section and a variation of the hybridization length, Lh, may mainly depend on variations in the second width profile, WP2, of the second InP-based cladding layer or the second InP-based cladding layer and the second part of the InP-based core layer that is arranged in contact with both the first part of the InP-based core layer and the second InP-based cladding layer instead of depending on variations in both said second width profile, WP2, and the first width profile, WP1, of at least the first InP-based cladding layer and the first part of the InP-based core layer that is arranged in contact with the first InP-based cladding layer.

It is noted that the angular increase of the second width profile, WP2, from the second width, W2, to the third width, W3, most closely represents the rate of change of the effective refractive index in the hybridization region along the hybridization length, Lh. If in the above-mentioned first exemplary embodiment of the PIC according to the invention, wherein the second width, W2, has a value of 2.75 μm and the third width, W3, has a value of 2.85 μm, an angle having a first value of 0.00477 degrees with an accuracy of ±0.00095 degrees is used, a mode conversion loss of at most −10 dB can be achieved.

The third width profile, WP3, of at least the first InP-based cladding layer and the first part of the InP-based core layer that is in contact with the first InP-based cladding layer and the fourth width profile, WP4, of the second InP-based cladding layer or the second InP-based cladding layer and the second part of the InP-based core layer that is in contact with the second InP-based cladding layer of the second portion of the first waveguide section of the elongated InP-based optical waveguide are configured to enable transformation of a TM0(TE1) mode into a quasi-TM0(TE1) mode with approximately 10% TE(TM) fraction. The same holds for the fifth width profile, WP5, of at least the first InP-based cladding layer and the first part of the InP-based core layer that is in contact with the first InP-based cladding layer and the sixth width profile, WP6, of the second InP-based cladding layer or the second InP-based cladding layer and the second part of the InP-based core layer that is in contact with the second InP-based cladding layer of the third portion of the first waveguide section of the elongated InP-based optical waveguide. The first waveguide section has a total length that is sufficient to support low-loss mode conversion. The first portion of the first waveguide section has a length that is larger than each of the respective lengths of the second portion and the third portion of the first waveguide section.

It is noted that any one of the second width profile, WP2, third width profile, WP3, fourth width profile, WP4, fifth width profile, WP5, and sixth width profile, WP6, can be configured to have any suitable shape. As seen in a plane parallel to the support substrate, any one of the aforementioned width profiles can for example have a linearly, adiabatically or monotonically tapered shape.

The second waveguide section and the third waveguide section of the elongated InP-based optical waveguide have symmetrical cross-sections as seen in the direction transverse to both the elongated InP-based optical waveguide and the support substrate. Such waveguide sections are commonly referred to as ridge waveguide sections. Advantages of ridge waveguide sections compared to rib waveguide sections are that the ridge waveguide sections have lower propagation losses, support smaller bend radii and are stabler in terms of mode shape. Therefore, it is advantageous that the second waveguide section and the third waveguide section of the elongated InP-based optical waveguide are configured as ridge waveguide sections. The second waveguide section and the third waveguide section can have any suitable width profile as long as their respective cross-sections as seen in the direction transverse to both the elongated InP-based optical waveguide and the support substrate are symmetrical.

Based on the above, it can be appreciated that the InP-based polarization rotator of the embodiment of the PIC has an improved design that enables at least one of an improved performance and an improved yield of the PIC due to at least reduced variations in critical dimensions of the InP-based polarization rotator of the PIC.

In an embodiment of the PIC according to the invention,
the third width profile, WP3, in the second portion of the first waveguide section has a linearly tapered shape or an adiabatically tapered shape between the fourth value, W4, at the third end part of the second portion and the fifth value, W5, at the fourth end part of the second portion; and
the fifth width profile, WP5, in the third portion of the first waveguide section has a linearly tapered shape or an adiabatically tapered shape between the eighth value, W8, at the fifth end part of the third portion and the ninth value, W9, at the sixth end part of the third portion.

In the event that at least one of the third width profile, WP3, and the fifth width profile, WP5, has a linearly tapered shape, the linearly tapered shape can for example be a piecewise linearly tapered shape. In the event that the third width profile, WP3, has a linearly tapered shape that is strictly increasing between the fourth vale, W4, and the fifth value, W5, and the fifth width profile, WP5, has a linearly tapered shape that is strictly decreasing between the eighth vale, W8, and the ninth value, W9, the third width profile, WP3, the first width profile, WP1, and the fifth width profile, WP5, in subsequently the second portion, the first portion and the third portion of the first waveguide section are configured to provide at least the first InP-based cladding layer and the first part of the InP-based core layer that is in contact with the first InP-based cladding layer with a skewed hexagonal shape.

An advantage of configuring the third width profile, WP3, and the fifth width profile, WP5, to have adiabatically tapered shapes instead of linearly tapered shapes is that the footprint of the PIC can be reduced while supporting low-loss propagation of optical radiation.

In an embodiment of the PIC according to the invention,
the second width profile, WP2, in the first portion of the first waveguide section has a linearly tapered shape or an adiabatically tapered shape between the second value, W2, at the first end part of the first portion and the third value, W3, at the second end part of the first portion;
the fourth width profile, WP4, in the second portion of the first waveguide section has a linearly tapered shape or an adiabatically tapered shape between the sixth value, W6, at the third end part of the second portion and said seventh value, W7, at the fourth end part of the second portion; and
the sixth width profile, WP6, in the third portion of the first waveguide section has a linearly tapered shape or an adiabatically tapered shape between the tenth value, W10, at the fifth end part of the third portion and the eleventh value, W11, at the sixth end part of the third portion.

In the event that at least one of the second width profile, WP2, the fourth width profile, WP4, and the sixth width profile, WP6, has a linearly tapered shape, the linearly tapered shape can for example be a piecewise linearly tapered shape or a linearly tapered shape that is strictly increasing between the respective values at the respective end parts of the respective portions of the first waveguide section of the elongated InP-based optical waveguide.

An advantage of configuring the second width profile, WP2, the fourth width profile, WP4, and the sixth width profile, WP6, to have adiabatically tapered shapes instead of linearly tapered shapes is that the footprint of the PIC can be reduced while supporting low-loss propagation of optical radiation.

In an embodiment of the PIC according to the invention,
the second width profile, WP2, in the first portion of the first waveguide section has a linearly tapered shape or an adiabatically tapered shape between the second value, W2, at the first end part of the first portion and the third value, W3, at the second end part of the first portion;
the third width profile, WP3, in the second portion of the first waveguide section has a linearly tapered shape or an adiabatically tapered shape between the fourth value, W4, at the third end part of the second portion and the fifth value, W5, at the fourth end part of the second portion;
the fourth width profile, WP4, in the second portion of the first waveguide section has a linearly tapered shape or an adiabatically tapered shape between the sixth value, W6, at the third end part of the second portion and the seventh value, W7, at the fourth end part of the second portion;
the fifth width profile, WP5, in the third portion of the first waveguide section has a linearly tapered shape or an adiabatically tapered shape between the eighth value, W8, at the fifth end part of the third portion and the ninth value, W9, at the sixth end part of the third portion; and
the sixth width profile, WP6, in the third portion of the first waveguide section has a linearly tapered shape or an adiabatically tapered shape between the tenth value, W10, at the fifth end part of the third portion to the eleventh value, W11, at the sixth end part of the third portion.

In the event that at least one of the second width profile, WP2, the third width profile, WP3, the fourth width profile, WP4, the fifth width profile, WP5, and the sixth width profile, WP6, has a linearly tapered shape, the linearly tapered shape can for example be a piecewise linearly tapered shape or a linearly tapered shape that with respect to the second width profile, WP2, the third width profile, WP3, the fourth width profile, WP4, and the sixth width profile, WP6, is strictly increasing between the respective values at the respective end parts of the respective portions of the first waveguide section of the elongated InP-based optical waveguide, and with respect to the fifth width profile, WP5, is strictly decreasing between the eighth value, W8, at the fifth end part of the third portion and the ninth value, W9, at the sixth end part of the third portion of the first waveguide section of the elongated InP-based optical waveguide.

An advantage of configuring the second width profile, WP2, the third width profile, WP3, the fourth width profile, WP4, the fifth width profile, WP5, and the sixth width profile, WP6, to have adiabatically tapered shapes instead of linearly tapered shapes is that the footprint of the PIC can be reduced while supporting low-loss propagation of optical radiation.

In an embodiment of the PIC according to the invention, the fourth width profile, WP4, in the second portion of the first waveguide section has a first part that, as seen in a plane parallel to the support substrate, has a circumference that is at least hexagonally shaped and that has a first side, said first side being arranged at the third end part of the second portion and being equal to said sixth value, W6, at the third end part of the second portion; and the sixth width profile, WP6, in the third portion of the first waveguide section has a second part that, as seen in a plane parallel to the support substrate, has a circumference that is at least hexagonally shaped and that has a second side, said second side being arranged at the sixth end part of the third portion and being equal to said eleventh value, W11, at the sixth end part of the third portion.

During fabrication of the above-defined embodiment of the PIC, the second InP-based cladding layer or the second InP-based cladding layer and the second part of the InP-based core layer that is in contact with the second InP-based cladding layer is provided with, as seen in the direction parallel to the support substrate, consecutively the eighth width profile, WP8, of the second waveguide section, the fourth width profile, WP4, the second width profile, WP2, and the sixth width profile, WP6, of the first waveguide section, and the tenth width profile, WP10, of the third waveguide section of the elongated InP-based optical waveguide using a first, shallow, dry etch. The first, shallow, dry etch can for example be performed using reactive ion etching.

The hexagonal shapes of said first part of the fourth width profile, WP4, at the third end part of the second portion of the first waveguide section and of said second part of the sixth width profile, WP6, at the sixth end part of the third portion of the first waveguide section result after exposure of unprotected sacrificial parts of the second InP-based cladding layer or the second InP-based cladding layer and the second part of the InP-based core layer that is in contact with the second InP-based cladding layer in respectively the second portion and the third portion of the first waveguide section to a second, deep, dry etch. Said unprotected sacrificial parts that were removed during the second, deep, dry etch enabled accommodating any overlay errors in the direction transverse to the elongated InP-based optical waveguide and parallel to the support substrate that are caused by misalignment during the lithographic process in which a masking layer that is to be used during the second, deep, dry etch is provided with a pattern that comprises, as seen in a direction parallel to the support substrate, consecutively the seventh width profile, WP7, of the second waveguide section, the third width profile, WP3, the first width profile, WP1, and the fifth width profile, WP5, of the first waveguide section, and the ninth width profile, WP9, of the third waveguide section of the elongated InP-based optical waveguide. The second, deep, dry etch can for example be performed using inductively coupled plasma etching.

By accommodating said overlay errors, non-optimal waveguide cross sections of the second waveguide section and the third waveguide section of the elongated InP-based optical waveguide can at least be reduced and ideally be prevented. As a result, unpredictable mode profiles in the second waveguide section and the third waveguide section that can have a negative effect on the yield of the PIC can at least be reduced and ideally be prevented.

In an embodiment of the PIC according to the invention, as seen in the direction parallel to the elongated InP-based optical waveguide,
the first portion of the first waveguide section has a first length, L1, that is larger than the hybridization length, Lh, the first length, L1, being in a first range from 450 µm to 750 µm or in a second range from 1450 µm to 1750 µm;
the second portion of the first waveguide section has a second length, L2, that is in a third range from 20 µm to 100 µm; and
the third portion of the first waveguide section has a third length, L3, that is in the third range from 20 µm to 100 µm.

It is noted that if the first length, L1, has a first value that is chosen from the first range, a first order conversion of a lower order TM mode to a higher order TE mode can be achieved. For example, if the second width, W2, of the second width profile, WP2, has a value of 2.75 µm, the third width, W3, of the second width profile, WP2, has a value of 2.85 µm, and the angular increase of the second width profile, WP2, has a first value of degrees with an accuracy of ±0.00095 degrees, then a first length, L1, having a value of 600 µm can achieve a straightforward first order conversion of TM0 to TE1.

If the first length, L1, has a second value that is chosen from the second range, a second order conversion of a lower order TM mode to a higher order TE mode can be achieved, i.e. the lower order TM mode first converts to the higher order TE mode, then back to the lower order TM mode, and finally to the higher order TE mode. For example, if the second width, W2, of the second width profile, WP2, has a value of 2.75 µm, the third width, W3, of the second width profile, WP2, has a value of 2.85 µm, and the angular increase of the second width profile, WP2, has a second value of 0.00179 degrees with an accuracy of ±0.00019 degrees, then a first length, L1, having a value of 1600 µm can achieve a second order conversion of TM0 to TE1 i.e. TM0 first converts to TE1, then back to TM0, and finally to TE1.

It is noted that although in principle even higher order conversions from a lower order TM mode to a higher order TE mode can be achieved for values of the first length, L1, beyond 1750 µm, such values for the first length, L1, would not only result in a mode conversion loss of more than −10 dB but also in a footprint of the PIC that would become unnecessarily large.

If the second length, L2, and/or the third length, L3, have a value smaller than 20 µm, significant optical losses can occur. If the second length, L2, and/or the third length, L3, have a value larger than 100 µm, the footprint of the PIC would become unnecessarily large. By choosing a value for the first length, L1, from the first range or form the second range, and values for the second length, L2, and the third length, L3, from the third range, the first waveguide section of the elongated InP-based optical waveguide can be configured to support low-loss mode conversion, i.e. having a mode conversion loss of at most −10 dB.

In an embodiment of the PIC according to the invention, at least the first InP-based cladding layer and the first part of the InP-based core layer that is arranged in contact with the first InP-based cladding layer of the second waveguide section have a seventh width profile, WP7, as seen in the direction transverse to the elongated InP-based optical waveguide and parallel to the support substrate, the seventh width profile, WP7, having a twelfth value, W12, that is equal to the fourth value, W4, of the third width profile, WP3, at the third end part of the second portion of the first waveguide section;

the second InP-based cladding layer or the second InP-based cladding layer and the second part of the InP-based core layer that is arranged in contact with both the first part of the InP-based core layer and the second InP-based cladding layer of the second waveguide section have an eighth width profile, WP8, as seen in the direction transverse to the elongated InP-based optical waveguide and parallel to the support substrate, the eighth width profile, WP8, having a thirteenth value, W13, that is equal to the sixth value, W6, of the fourth width profile, WP4, at the third end part of the second portion of the first waveguide section; and at least the first InP-based cladding layer and said first part of the InP-based core layer of the third waveguide section have a ninth width profile, WP9, as seen in the direction transverse to the elongated InP-based optical waveguide and parallel to the support substrate, the ninth width profile, WP9, having a fourteenth value, W14, that is equal to the ninth value, W9, of the fifth width profile, WP5, at the sixth end part of the third portion of the first waveguide section;

the second InP-based cladding layer or the second InP-based cladding layer and said second part of the InP-based core layer of the third waveguide section has a tenth width profile, WP10, as seen in the direction transverse to the elongated InP-based optical waveguide and parallel to the support substrate, the tenth width profile, WP10, having a fifteenth value, W15, that is equal to the eleventh value, W11, of the sixth width profile, WP6, at the sixth end part of the third portion of the first waveguide section.

As mentioned above, it is advantageous that the second waveguide section and the third waveguide section of the PIC according to the present invention are ridge waveguide sections, i.e. having symmetrical cross-sections as seen in the direction transverse to both the elongated InP-based optical waveguide and the support substrate. As a result, the seventh width profile, WP7, and the eight width profile, WP8, of the second waveguide section have equal shapes as seen in the direction transverse to the elongated InP-based optical waveguide and parallel to the support substrate. The same holds for the ninth width profile, WP9, and the tenth width profile, WP10, of the third waveguide section. In principle, the second waveguide section and the third waveguide section of the above-defined embodiment of the PIC can be configured to have any suitable shape. Typically, the twelfth value, W12, of the seventh width profile, WP7, and the thirteenth value, W13, of the eighth width profile, WP8, of the second waveguide section are constant in the finally manufactured PIC. In relation to FIGS. 7C and 7H, an example is provided regarding possible shapes of the seventh width profile, WP7, and the eighth width profile, WP8, of the second waveguide section and of the ninth width profile, WP9, and the tenth width profile, WP10, of the third waveguide section, respectively during manufacturing of the PIC to arrive at a first constant value of the twelfth value, W12, of the seventh width profile, WP7, and the thirteenth value, W13, of the eighth width profile, WP8, of the second waveguide section, and a second constant value of the fourteenth value, W14, of the ninth width profile, WP9, and the fifteenth value, W15, of the tenth width profile, WP10, of the third waveguide section in the finally manufactured PIC. Based on the above, the first constant value and the second constant value typically are different.

In an embodiment of the PIC according to the invention, the InP-based core layer comprises InGaAsP material.

In an embodiment of the PIC according to the invention, the PIC is a hybrid PIC. A hybrid PIC allows the advantages of the present invention to be applied in the domain of III-V photonics as well as in the domain of silicon photonics. A hybrid PIC can comprise photonic components comprising group III-V semiconductor materials, e.g. InP-based semiconductor materials, and photonic components comprising group IV semiconductor materials, e.g. Si-based semiconductor materials, on a single die. An advantage of a hybrid PIC according to the invention can be that photonic components can be exchanged for example in the case of malfunction or breakdown.

In an embodiment of the PIC according to the invention, the PIC is an InP-based monolithic PIC. An advantage of an InP-based monolithic PIC is that both active components such as for example light-generating and/or light-absorbing optical devices, and passive components such as for example light-guiding and/or light-switching optical devices, can be integrated on the same semiconductor substrate of a single die. As a result, fabrication of an InP-based monolithic PIC can be less cumbersome and therefore less expensive than the assembly of a hybrid PIC that requires assembly steps for the hybrid interconnection of the active and passive opto-electronic devices each of which typically are fabricated on different substrates. In addition, an InP-based monolithic PIC can allow the PIC to have a smaller total footprint than the total footprint of a hybrid PIC.

According to another aspect of the present invention, an opto-electronic system is provided comprising a PIC according to the invention. The opto-electronic system can for example, but not exclusively, be used for telecommunication applications, LIDAR or sensor applications. The opto-electronic system can be one of a receiver, a transceiver, a coherent receiver and a coherent transceiver. Because the improved design of the InP-based polarization rotator can improve at least one of the performance and the yield of the PIC according to the present invention, at least one of the performance and the yield of the opto-electronic system that comprises said PIC can also be improved.

According to yet another aspect of the present invention, a method of fabricating a PIC that comprises an InP-based polarization rotator that has a support substrate, the InP-based polarization rotator comprising an elongated InP-based optical waveguide that comprises:

a first InP-based cladding layer that is at least a part of the support substrate or an epitaxial InP-based layer that is arranged to at least partially cover the support substrate;

an InP-based core layer that is arranged to cover the first InP-based cladding layer; and a second InP-based cladding layer that is arranged to at least partially cover the InP-based core layer;

wherein the elongated InP-based optical waveguide is configured and arranged to have:

a first waveguide section that comprises:

a first portion that has a first end part and a second end part, wherein:

at least the first InP-based cladding layer and a first part of the InP-based core layer that is arranged in contact with the first InP-based cladding layer have a first width profile, WP1, as seen in a direction transverse to the elongated InP-based optical waveguide and parallel to the support substrate, the first width profile, WP1, having a first value, W1, that is constant;

the second InP-based cladding layer or the second InP-based cladding layer and a second part of the InP-based core layer that is arranged in contact with both the first part of the InP-based core layer and the second InP-based cladding layer have a second width profile, WP2, as seen in the direction transverse to the elongated InP-based optical waveguide and parallel to the support substrate, the second width profile, WP2, having:
  a second value, W2, at the first end part of the first portion, the second value, W2 being smaller than the first value, W1, of the first width profile, WP1; and
  a third value, W3, at the second end part of the first portion, the third value, W3, being larger than the second value, W2, and smaller than the first value, W1, of the first width profile, WP1; and the first width profile, WP1, and the second width profile, WP2, are configured and arranged to provide the first portion with a hybridization region in which the elongated InP-based optical waveguide has effective refractive index values along a hybridization length, Lh, as seen in a direction parallel to the elongated InP-based optical waveguide, said effective refractive index values enabling a conversion of a lower order TM mode into a higher order TE mode in the hybridization region with a mode conversion loss of at most −10 dB;

a second portion having a third end part and a fourth end part that is arranged in optical connection with the first end part of said first portion, wherein:
  at least the first InP-based cladding layer and said first part of the InP-based core layer have a third width profile, WP3, as seen in the direction transverse to the elongated InP-based optical waveguide and parallel to the support substrate, the third width profile, W3, having:
    a fourth value, W4, at the third end part of the second portion, the fourth value, W4, being smaller than the first value, W1, of the first width profile, WP1, in the first portion; and
    a fifth value, W5, at the fourth end part of the second portion, the fifth value, W5, being equal to the first value, W1, of the first width profile, WP1, in the first portion; and
  the second InP-based cladding layer or the second InP-based cladding layer and said second part of the InP-based core layer have a fourth width profile, WP4, as seen in the direction transverse to the elongated InP-based optical waveguide and parallel to the support substrate, the fourth width profile, WP4, having:
    a sixth value, W6, at the third end part of the second portion, the sixth value, W6, being equal to the fourth value, W4, of the third width profile, WP3; and
    a seventh value, W7, at the fourth end part of the second portion, the seventh value, W7, being equal to the second value, W2, of the second width profile, WP2, in the first portion; and a third portion having a fifth end part that is arranged in optical connection with the second end part of said first portion, and a sixth end part, wherein:
  at least the first InP-based cladding layer and said first part of the InP-based core layer have a fifth width profile, WP5, as seen in the direction transverse to the elongated InP-based optical waveguide and parallel to the support substrate, the fifth width profile, WP5, having:
    an eighth value, W8, at the fifth end part of the third portion, the eighth value, W8, being equal to the first value, W1, of the first width profile, WP1, in the first portion; and
    a ninth value, W9, at the sixth end part of the third portion, the ninth value, W9, being smaller than the eighth value, W8, and larger than the fourth value, W4, of the third width profile, WP3, in the second portion; and
  the second InP-based cladding layer or the second InP-based cladding layer and said second part of the InP-based core layer have a sixth width profile, WP6, as seen in the direction transverse to the elongated InP-based optical waveguide and parallel to the support substrate, the sixth width profile, WP6, having:
    a tenth value, W10, at the fifth end part of the third portion, the tenth value, W10, being equal to the third value, W3, of the second width profile, WP2, in the first portion; and
    an eleventh value, W11, at the sixth end part of the third portion, the eleventh value, W11, being equal to the ninth value, W9, of the fifth width profile, WP5;

a second waveguide section that comprises:
  a seventh end part;
  an eighth end part that is arranged in optical connection with the third end part of the second portion of the first waveguide section; and
  a first cross-section that is symmetrical as seen in a direction transverse to both the elongated InP-based optical waveguide and the support substrate, the first cross-section allowing the second waveguide section to support at least one of TM0, TE0, TM1 and TE1 modes;
wherein:
  at least the first InP-based cladding layer and said first part of the InP-based core layer of the second waveguide section have a seventh width profile, WP7, as seen in the direction transverse to the elongated InP-based optical waveguide and parallel to the support substrate, the seventh width profile, WP7, having a twelfth value, W12, that is equal to the fourth value, W4, of the third width profile, WP3, at the third end part of the second portion of the first waveguide section; and
  the second InP-based cladding layer or the second InP-based cladding layer and said second part of the InP-based core layer of the second waveguide section have an eighth width profile, WP8, as seen in the direction transverse to the elongated InP-based optical waveguide and parallel to the support substrate, the eighth width profile, WP8, having a thirteenth value, W13, that is equal to the sixth value, W6, of the fourth width profile, WP4, at the third end part of the second portion of the first waveguide section; and a third waveguide section that comprises:

a ninth end part that is arranged in optical connection with the sixth end part of the third portion of the first waveguide section;
a tenth end part; and
a second cross-section that is symmetrical as seen in the direction transverse to both the elongated InP-based optical waveguide and the support substrate, the second cross-section allowing the third waveguide section to support at least one of TM0, TE0, TM1 and TE1 modes;

wherein:
at least the first InP-based cladding layer and said first part of the InP-based core layer of the third waveguide section have a ninth width profile, WP9, as seen in the direction transverse to the elongated InP-based optical waveguide and parallel to the support substrate, the ninth width profile, WP9, having a fourteenth value, W14, that is equal to the ninth value, W9, of the fifth width profile, WP5, at the sixth end part of the third portion of the first waveguide section; and
the second InP-based cladding layer or the second InP-based cladding layer and said second part of the InP-based core layer of the third waveguide section has a tenth width profile, WP10, as seen in the direction transverse to the elongated InP-based optical waveguide and parallel to the support substrate, the tenth width profile, WP10, having a fifteenth value, W15, that is equal to the eleventh value, W11, of the sixth width profile, WP6, at the sixth end part of the third portion of the first waveguide section;

wherein the method comprises:
providing the support substrate, said first InP-based cladding layer, said InP-based core layer, and said second InP-based cladding layer for the elongated InP-based optical waveguide of the InP-based polarization rotator;
providing a first masking layer to cover the second InP-based cladding layer or at least one protection layer that is arranged to cover the second InP-based cladding layer;
applying a first lithographic process to the first masking layer to provide the first masking layer with a first pattern that comprises, as seen in the direction parallel to the support substrate, consecutively said eighth width profile, WP8, of the second waveguide section, said fourth width profile, WP4, said second width profile, WP2, and said sixth width profile, WP6, of the first waveguide section, and said tenth width profile, WP10, of the third waveguide section of the elongated InP-based optical waveguide, thereby obtaining:
areas of the second InP-based cladding layer or said at least one protection layer that is arranged to cover the second InP-based cladding layer that are covered with the first masking layer that is shaped in accordance with the first pattern; and
uncovered areas of the second InP-based cladding layer or said at least one protection layer that is arranged to cover the second InP-based cladding layer;
applying a first dry etch to the first masking layer and the uncovered areas of the second InP-based cladding layer or said at least one protection layer that is arranged to cover the second InP-based cladding layer for transferring the first pattern to at least one of the second InP-based cladding layer and the second part of the InP-based core layer that is arranged in contact with the second InP-based cladding layer, thereby obtaining:
an etched first masking layer; and
first etched areas of InP-based material at a first etch depth, d1, relative to the unetched areas of the second InP-based cladding layer or said at least one protection layer that is arranged to cover the second InP-based cladding layer;
removing the etched first masking layer from unetched areas of the second InP-based cladding layer or said at least one protection layer that is arranged to cover the second InP-based cladding layer;
providing a second masking layer to cover the first etched areas of InP-based material and the unetched areas of the second InP-based cladding layer or said at least one protection layer that is arranged to cover the second InP-based cladding layer;
applying a second lithographic process to the second masking layer to provide the second masking layer with a second pattern that comprises, as seen in the direction parallel to said eighth width profile, WP8, of the second waveguide section, said fourth width profile, WP4, said second width profile, WP2, and said sixth width profile, WP6, of the first waveguide section, and said tenth width profile, WP10, of the third waveguide section of the elongated InP-based optical waveguide, consecutively said seventh width profile, WP7, of the second waveguide section, said third width profile, WP3, said first width profile, WP1, and said fifth width profile, WP5, of the first waveguide section, and said ninth width profile, WP9, of the third waveguide section of the elongated InP-based optical waveguide, thereby obtaining:
the second masking layer that is shaped in accordance with the second pattern covering:
at least parts of the unetched areas of the second InP-based cladding layer or said at least one protection layer that is arranged to cover the second InP-based cladding layer; and
parts of the first etched areas of InP-based material;
uncovered parts of the first etched areas of InP-based material; and
uncovered parts of the unetched areas of the second InP-based cladding layer or said at least one protection layer that is arranged to cover the second InP-based cladding layer if the second masking layer that is shaped in accordance with the second pattern partially covers the unetched areas of the second InP-based cladding layer or said at least one protection layer that is arranged to cover the second InP-based cladding layer;
applying a second dry etch to:
the second masking layer;
the uncovered parts of the first etched areas of InP-based material; and
the uncovered parts of the unetched areas of the second InP-based cladding layer or said at least one protection layer that is arranged to cover the second InP-based cladding layer if the second masking layer that is shaped in accordance with the second pattern partially covers the unetched areas of the second InP-based cladding layer or said at least one protection layer that is arranged to cover the second InP-based cladding layer;
for transferring the second pattern to at least the first InP-based cladding layer and said first part of the InP-based core layer, thereby obtaining:
an etched second masking layer; and second etched areas of InP-based material at a second etch depth, d2, relative to the unetched areas of the second InP-based cladding layer or said at least one protection layer that is arranged to cover the second InP-based cladding layer, the second etch depth, d2, being larger than the first etch depth, d1. The PIC that is directly obtained by performing the method according to the invention can have at least one of the above-described advantages.

BRIEF DESCRIPTION OF THE DRAWINGS

Further features and advantages of the invention will become apparent from the description of exemplary and non-limiting embodiments of a PIC according to the present invention, an opto-electronic system comprising such a PIC, and a method of improved determination of an overall performance of a PIC according to the present invention.

The person skilled in the art will appreciate that the described embodiments of the PIC, the method and the opto-electronic system are exemplary in nature only and not to be construed as limiting the scope of protection in any way. The person skilled in the art will realize that alternatives and equivalent embodiments of the PIC, the method and the opto-electronic system can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts.

Figure 1:
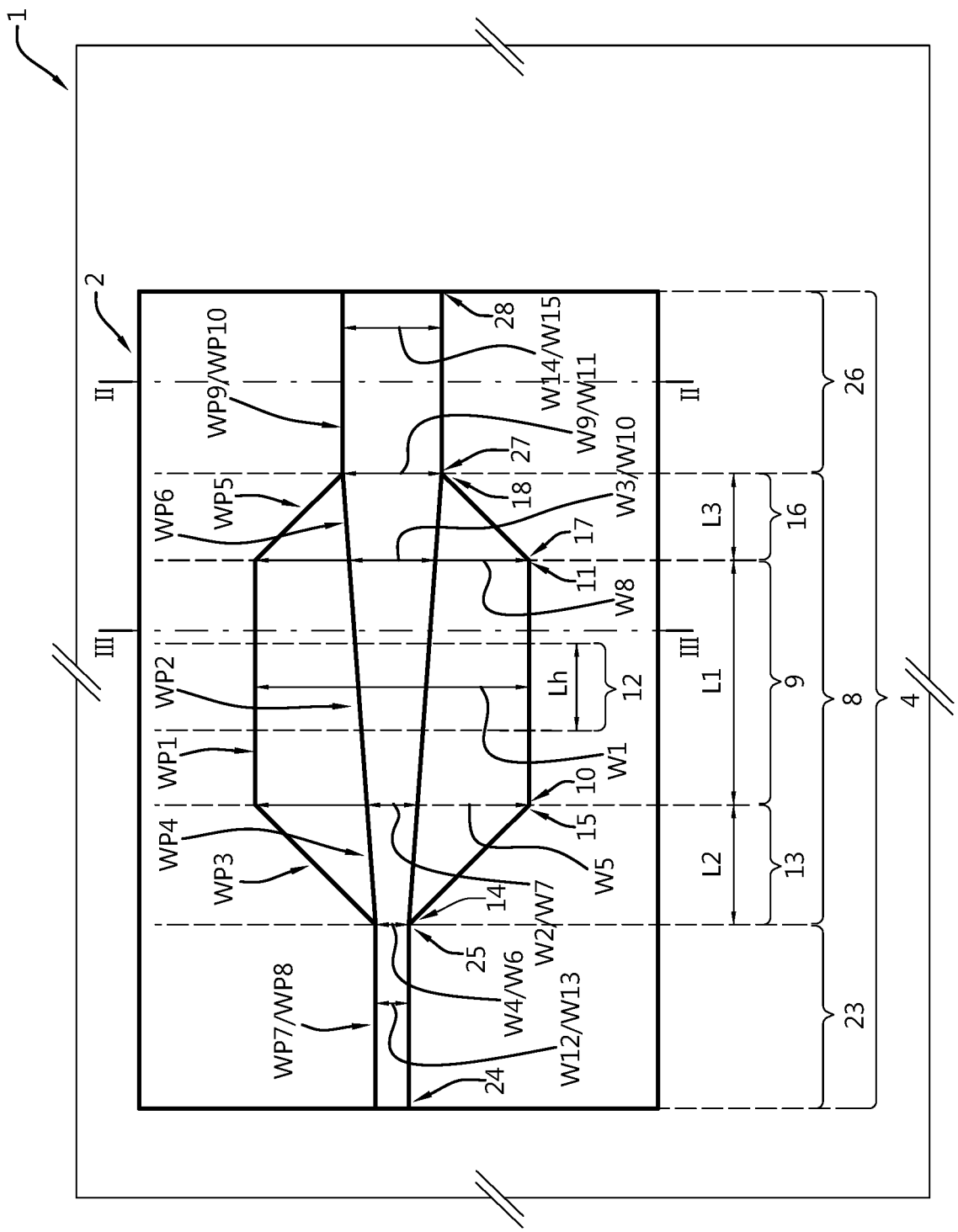
Figure 2:
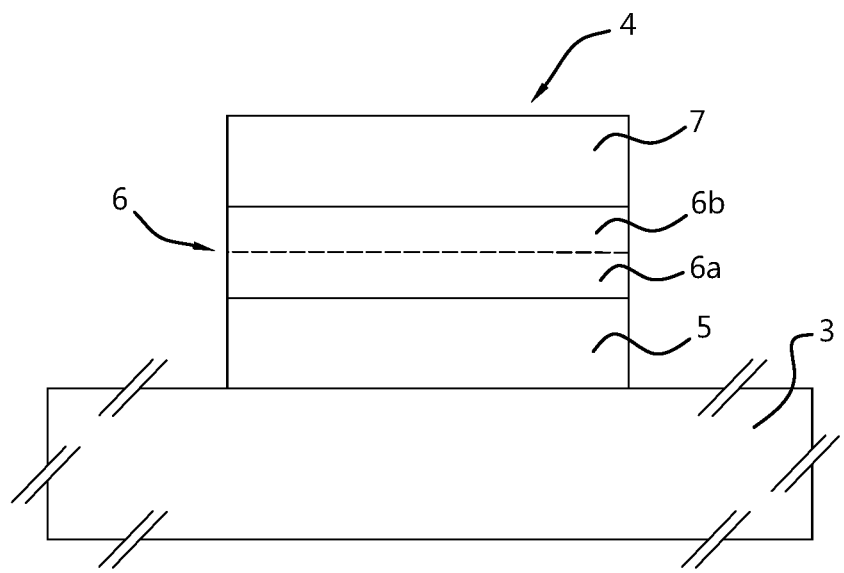
Figure 3:
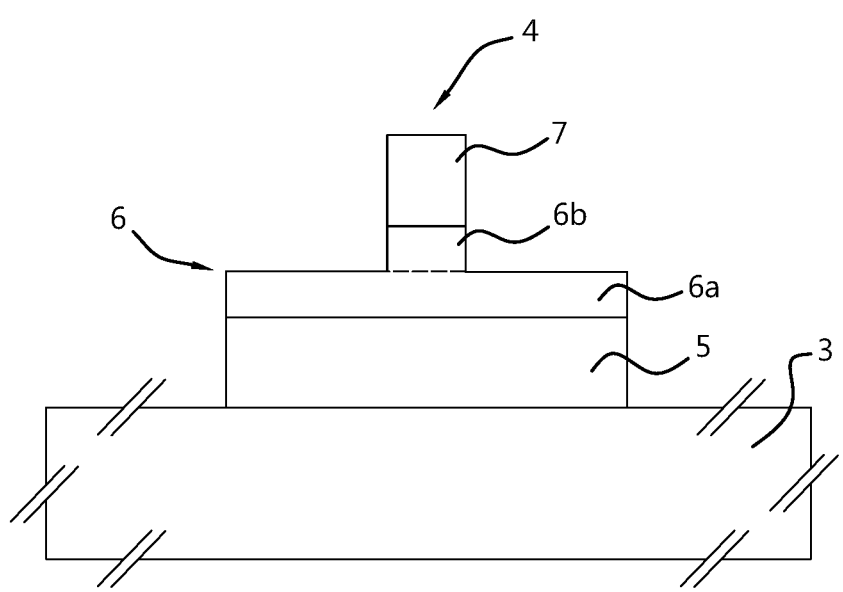
Figure 4:
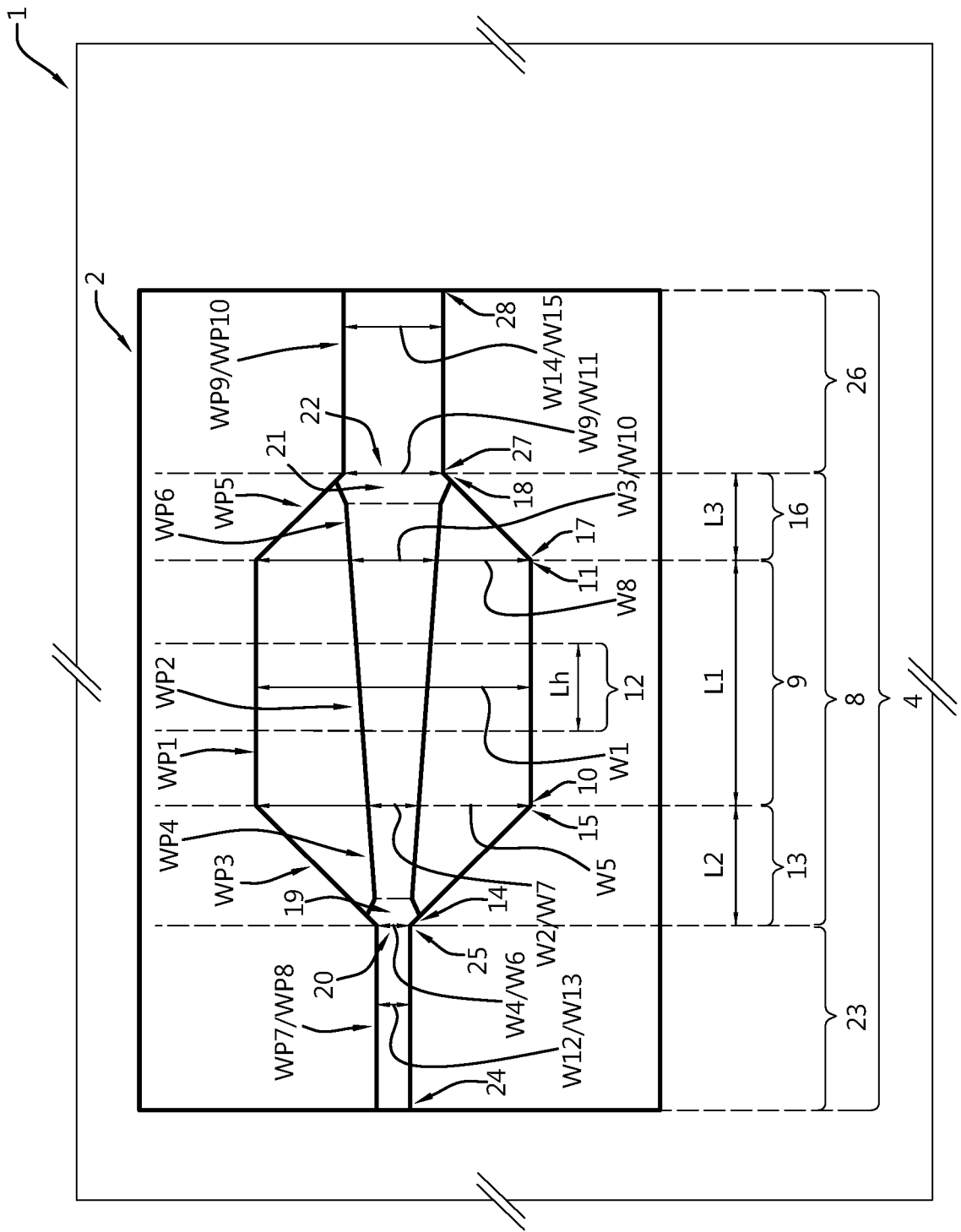
Figure 5:
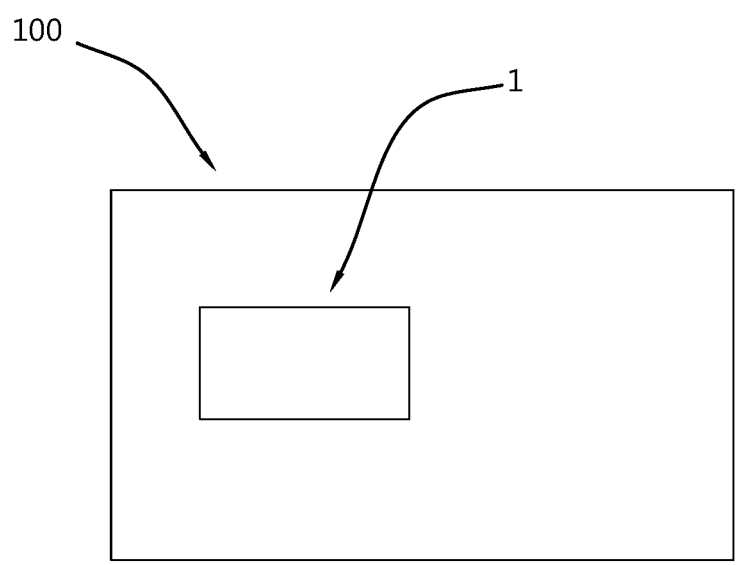
Figure 6:
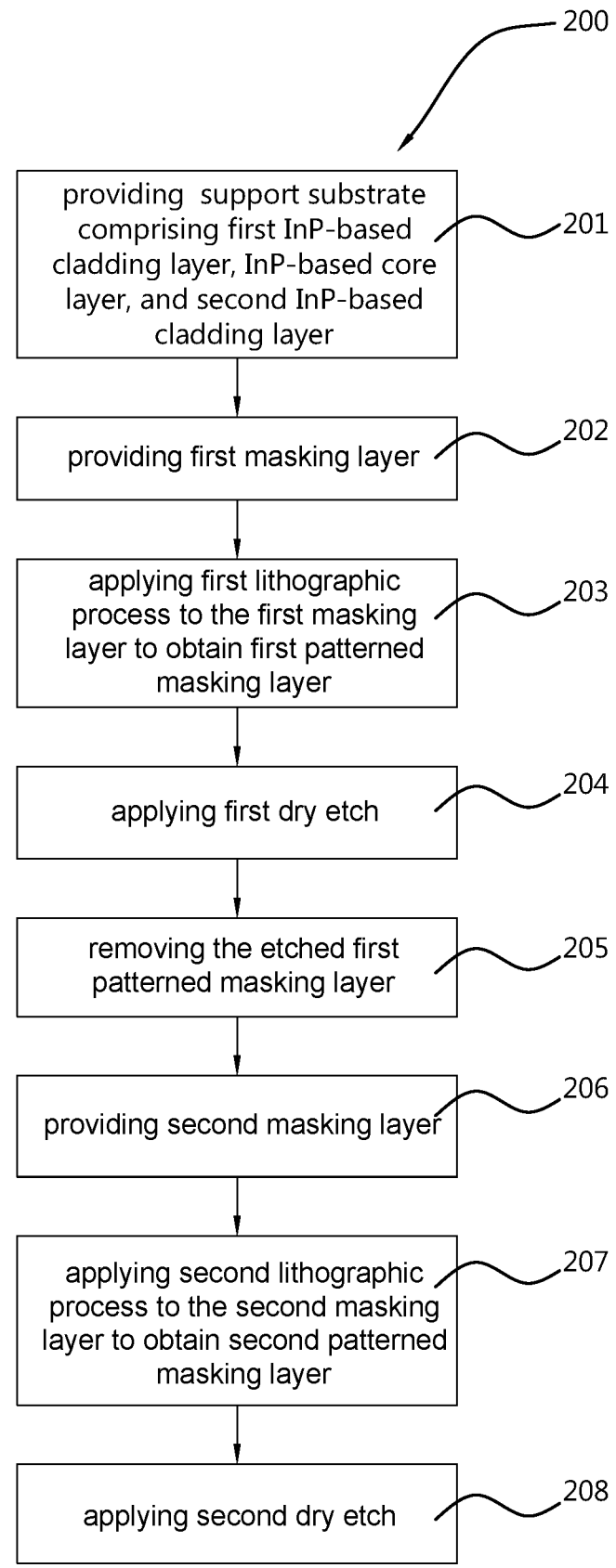

On the attached drawing sheets,

FIG. 1 shows a schematic top view of a first exemplary, non-limiting embodiment of a PIC according to the invention;

FIG. 2 shows a schematic cross-section of the InP-based polarization rotator of the first exemplary, non-limiting embodiment of the PIC shown in FIG. 1 at the location of the third waveguide section of the elongated InP-based optical waveguide;

FIG. 3 shows a schematic cross-section of the InP-based polarization rotator of the first exemplary, non-limiting embodiment of the PIC shown in FIG. 1 at the location of the first portion of the first waveguide section of the elongated InP-based optical waveguide;

FIG. 4 shows a schematic top view of a second exemplary, non-limiting embodiment of the PIC according to the invention;

FIG. 5 shows a schematic top view of a first exemplary, non-limiting embodiment of an opto-electronic system comprising a PIC according to the present invention;

FIG. 6 shows a flow diagram of a first exemplary, non-limiting embodiment of the method according to the invention; and FIGS. 7A-7K show schematic cross-sections and top views of the second exemplary, non-limiting embodiment of the PIC according to the invention illustrating the steps of the flow diagram of the first exemplary, non-limiting embodiment of the method shown in FIG. 6.

DETAILED DESCRIPTION OF EMBODIMENTS

FIG. 1 shows a schematic top view of a first exemplary, non-limiting embodiment of a PIC 1 according to the invention comprising an InP-based polarization rotator 2. The InP-based polarization rotator 2 has a support substrate 3 and an elongated InP-based optical waveguide 4 that is configured and arranged to have a first waveguide section 8, a second waveguide section 23, and a third waveguide section 26. Schematic cross-sections of the support substrate 3 are shown amongst others in FIGS. 2, 3 and 7A. In the event that the PIC 1 is a hybrid PIC, the support substrate 3 can comprise any suitable material. In the event that the PIC 1 is a monolithic InP-based PIC, the support substrate comprises InP-based material.

Schematic cross-sections of the elongated InP-based optical waveguide 4 of the InP-based polarization rotator 2 at the locations of the third waveguide section 26 and the first waveguide section 8 are shown in FIGS. 2 and 3, respectively. From the cross-section shown in FIG. 2, it is clear that the third waveguide section 26 has a symmetrical cross-section as seen in a direction transverse to both the elongated InP-based optical waveguide 4 and the support substrate 3. As mentioned above, such a waveguide section is commonly referred to as a ridge waveguide section. From the cross-section shown in FIG. 3, it is clear that the first waveguide section 8 has an asymmetrical cross-section as seen in the direction transverse to both the elongated InP-based optical waveguide 4 and the support substrate 3. As mentioned above, such a waveguide section is commonly referred to as a rib waveguide section.

FIGS. 2 and 3 show that the elongated InP-based optical waveguide 4 comprises a first InP-based cladding layer 5, an InP-based core layer 6, and a second InP-based cladding layer 7. The InP-based core layer 6 can comprise InGaAsP material having a refractive index that is higher than the refractive indices of both the first InP-based cladding layer 5 and the second InP-based cladding layer 7. Typically, the refractive indices of the first InP-based cladding layer 5 and the second InP-based cladding layer 7 are the same.

In accordance with the first exemplary, non-limiting embodiment of the PIC 1 shown in FIG. 1, the first InP-based cladding layer 5 as shown in the schematic cross-sections of the elongated InP-based optical waveguide in FIGS. 2 and 3, is an epitaxial InP-based layer that is arranged to partially cover the support substrate 3. It is noted that in accordance with another exemplary, non-limiting embodiment of the PIC (not shown), the first InP-based cladding layer can be at least a part of the support substrate 3. The InP-based core layer 6 has a first part 6a that is arranged in contact with the first InP-based cladding layer 5 and is arranged to fully cover the first InP-based cladding layer 5. The InP-based core layer 6 also has a second part 6b that is arranged in contact with both said first part 6a of the InP-based core layer 6 and the second InP-based cladding layer 7. Said second part 6b of the InP-based core layer 6 is arranged to fully cover said first part 6a of the InP-based core layer 6 at the location of the third waveguide section 26 that is configured as a ridge waveguide section, and to partially cover said first part 6a of the InP-based core layer 6 at the location of the first waveguide section 8 that is configured as a rib waveguide section. The second InP-based cladding layer 7 is arranged to fully cover said second part 6b of the InP-based core layer 6.

FIG. 1 shows that the first waveguide section 8 of the elongated InP-based optical waveguide 4 comprises a first portion 9 having a first length, L1, a second portion 13 having a second length, L2, and a third portion 16 having a third length, L3. As mentioned above, the first length, L1, is larger than the hybridization length, Lh, and can have a value that is chosen from the first range from 450 μm to 750 μm or from the second range from 1450 μm to 1750 μm. If, for example, the second width, W2, of the second width profile, WP2, has a value of 2.75 μm, the third width, W3, of the second width profile, WP2, has a value of 2.85 µm, and the angular increase of the second width profile, WP2, has a first value of 0.00477 degrees with an accuracy of ±0.00095 degrees, then a first length. L1, having a value of 600 µm can achieve a straightforward first order conversion of TM0 to TE1.

If the first length, L1, has a second value that is chosen from the second range, a second order conversion of a lower order TM mode to a higher order TE mode can be achieved, i.e. the lower order TM mode first converts to the higher order TE mode, then back to the lower order TM mode, and finally to the higher order TE mode. For example, if the second width, W2, of the second width profile, WP2, has a value of 2.75 µm, the third width, W3, of the second width profile, WP2, has a value of 2.85 µm, and the angular increase of the second width profile, WP2, has a second value of 0.00179 degrees with an accuracy of ±0.00019 degrees, then a first length, L1, having a value of 1600 µm can achieve a second order conversion of TM0 to TE1, i.e. TM0 first converts to TE1, then back to TM0, and finally to TE1.

It is noted that although in principle even higher order conversions from a lower order TM mode to a higher order TE mode can be achieved for values of the first length, L1, beyond 1750 µm, such values for the first length, L1, would not only result in a mode conversion loss of more than −10 dB but also in a footprint of the PIC 1 that would become unnecessarily large.

If the second length, L2, and/or the third length, L3, have a value smaller than 20 µm, then significant optical losses can occur. If the second length, L2, and/or the third length, L3, have a value larger than 100 µm, then the PIC 1 can have a footprint that is unnecessarily large. By choosing a value for the first length, L1, from the first range or form the second range, and values for the second length, L2, and the third length, L3, from the third range, the first waveguide section 9 of the elongated InP-based optical waveguide 4 can be configured to support low-loss mode conversion, i.e. having a mode conversion loss of at most −10 dB.

The first portion 9 has a first end part 10 and a second end part 11. The first InP-based cladding layer 5 and the first part 6a of the InP-based core layer 6 that is arranged in contact with the first InP-based cladding layer 5 have a first width profile, WP1, as seen in a direction transverse to the elongated InP-based optical waveguide 4 and parallel to the support substrate 3, the first width profile, WP1, having a first value, W1, that is constant. In accordance with another embodiment of the PIC (not shown), also a part of the support substrate 3 can have the first width profile, WP1.

The second InP-based cladding layer 7 and the second part 6b of the InP-based core layer 6 that is arranged in contact with both the first part 6a of the InP-based core layer 6 and the second InP-based cladding layer 7 have a second width profile, WP2, as seen in the direction transverse to the elongated InP-based optical waveguide 4 and parallel to the support substrate 3. The second width profile, WP2, has a linearly tapered shape that is strictly increasing from a second value, W2, at the first end part 10 of the first portion 9 to a third value, W3, at the second end part 11 of the first portion 9. The second value, W2, is smaller than the first value, W1, of the first width profile, WP1, and the third value, W3, is larger than the second value, W2, and smaller than the first value, W1. It is noted that in accordance with yet another embodiment of the PIC (not shown), only the second InP-based cladding layer 7 can have the second width profile, WP2. In that case, said second part 6b of the InP-based core layer 6 has the first width profile, WP1, having the first constant value, W1.

The second portion 13 of the first waveguide section 8 has a third end part 14 and a fourth end part 15 that is arranged in optical connection with the first end part 10 of the first portion 9. The first InP-based cladding layer 5 and said first part 6a of the InP-based core layer 6 in the second portion 13 have a third width profile, WP3, as seen in the direction transverse to the elongated InP-based optical waveguide 4 and parallel to the support substrate 3. The third width profile, W3, has a linearly tapered shape that is strictly increasing from a fourth value, W4, at the third end part 14 of the second portion 13 to a fifth value, W5, at the fourth end part 15 of the second portion 13. The fourth value, W4, is smaller than the first value, W1, of the first width profile, WP1, in the first portion 9, and the fifth value, W5, is equal to the first value, W1, of the first width profile, WP1, in the first portion 9. In accordance with another embodiment of the PIC (not shown), also a part of the support substrate 3 can have the third width profile, WP3.

The second InP-based cladding layer 7 and said second part 6b of the InP-based core layer 6 in the second portion 13 have a fourth width profile, WP4, as seen in the direction transverse to the elongated InP-based optical waveguide 4 and parallel to the support substrate 3. The fourth width profile, WP4, has a linearly tapered shape that is strictly increasing from a sixth value, W6, at the third end part 14 of the second portion 13 to a seventh value, W7, at the fourth end part 15 of the second portion 13. The sixth value, W6, is equal to the fourth value, W4, of the third width profile, WP3, and the seventh value, W7, is equal to the second value, W2, of the second width profile, WP2, in the first portion 9. It is noted that in accordance with yet another embodiment of the PIC (not shown), only the second InP-based cladding layer 7 can have the fourth width profile, WP4. In that case, said second part 6b of the InP-based core layer 6 also has the third width profile, WP3.

The third portion 16 of the first waveguide section 8 has a fifth end part 17 that is arranged in optical connection with the second end part 11 of the first portion 9 of the first waveguide section 8, and a sixth end part 18. The first InP-based cladding layer 5 and said first part 6a of the InP-based core layer 6 in the third portion 16 have a fifth width profile, WP5, as seen in the direction transverse to the elongated InP-based optical waveguide 4 and parallel to the support substrate 3. The fifth width profile, WP5, has a linearly tapered shape that is strictly decreasing from an eighth value, W8, at the fifth end part 17 of the third portion 16 to a ninth value, W9, at the sixth end part 18 of the third portion 16. The eighth value, W8, is equal to the first constant value, W1, of the first width profile, WP1, in the first portion 9 of the first waveguide section 8, and the ninth value, W9, is smaller than the eighth value, W8, and larger than the fourth value, W4, of the third width profile, WP3, in the second portion 13 of the first waveguide section 8. In accordance with another embodiment of the PIC (not shown), also a part of the support substrate 3 can have the fifth width profile, WP5.

The second InP-based cladding layer 7 and said second part 6b of the InP-based core layer 6 in the third portion 16 have a sixth width profile, WP6, as seen in the direction transverse to the elongated InP-based optical waveguide 4 and parallel to the support substrate 3. The sixth width profile, WP6, has a linearly tapered shape that is strictly increasing from a tenth value, W10, at the fifth end part 17 of the third portion 16 to an eleventh value, W11, at the sixth end part 18 of the third portion 16. The tenth value, W10, is equal to the third value, W3, of the second width profile, WP2, in the first portion 9, and the eleventh value, W11, is equal to the ninth value, W9, of the fifth width profile, WP5. It is noted that in accordance with yet another embodiment of the PIC (not shown), only the second InP-based cladding layer 7 can have the sixth width profile, WP6. In that case, said second part 6b of the InP-based core layer 6 also has the fifth width profile, WP5.

FIG. 1 shows that, as seen in a plane parallel to the support substrate 3, the third width profile, WP3, the first width profile, WP1, and the fifth width profile, WP5, in subsequently the second portion 13, the first portion 9 and the third portion 16 of the first waveguide section 8 provide the first InP-based cladding layer 5 and the said part 6a of the InP-based core layer 6 with a skewed hexagonal shape.

It is noted that in accordance with a further embodiment of the PIC (not shown), any one of the width profiles WP1-WP6 can have adiabatically tapered shapes instead of linearly tapered shapes. In that case, the footprint of the PIC can be reduced while supporting low-loss propagation of optical radiation.

As mentioned above, the spatial asymmetry between the first InP-based cladding layer 5 and the second InP-based cladding layer 7 in the first waveguide section 8 of the elongated InP-based optical waveguide 4 enables the first portion 9 of the first waveguide section 8 to comprise a hybridization region 12 that has a hybridization length, Lh, in which the effective refractive indices of respectively the lower order TM mode, e.g. the fundamental TM mode (TM0), and the higher order TE mode, e.g. TE1, are similar or as similar as possible. As a result, upon propagation of the lower order TM mode across the first waveguide section 8 towards the third waveguide section 26, conversion of the lower order TM mode, e.g. TM0, into the higher order TE mode, e.g. TE1, can be achieved in the hybridization region 12. It is noted that the hybridization length, Lh, is smaller than the first length, L1, of the first portion 9 of the first waveguide section 8.

Furthermore, as discussed above, the first width profile, WP1, and the second width profile, WP2, are configured and arranged to provide the first portion 9 of the first waveguide section 8 of the elongated InP-based optical waveguide 4 with a hybridization region 12 in which the elongated InP-based optical waveguide 4 has effective refractive index values along the hybridization length, Lh, as seen in a direction parallel to the elongated InP-based optical waveguide 4. Said effective refractive index values enable a conversion of a lower order TM mode into a higher order TE mode in the hybridization region 12 with a mode conversion loss of at most −10 dB.

As discussed above, control of the hybridization length, Lh, is important because if the hybridization length, Lh, is too short, the lower order TM mode will not have time to fully convert into a converted higher order TE mode. Conversely, if the hybridization length, Lh, is too long, the converted higher order TE mode can start to convert back into the lower order TM mode before the end of the hybridization region 12. In addition, at some point in the hybridization region 12, the effective refractive index of the elongated InP-based optical waveguide 4 has a value allowing the mode conversion loss to have a minimum value. At this so-called crossing point in the hybridization region 12, there is a maximum in the conversion of the lower order TM mode into the converted higher order TE mode. Ideally, the crossing point is centered in the hybridization region 12, i.e. midway the hybridization length, Lh.

If the second width, W2, of the second width profile, WP2, of the PIC 1 shown in FIG. 1 has a value of for example 2.75 μm, the third width, W3, of the second width profile, WP2, has a value of for example 2.85 μm, and the first width, W1, of the first width profile, WP1, has a value of for example at least 8 μm, a shift of the hybridization region 12 along the first portion 9 of the first waveguide section 8 and a variation of the hybridization length, Lh, may mainly depend on variations in the second width profile, WP2, of the second InP-based cladding layer 7 or the second InP-based cladding layer 7 and the second part 6b of the InP-based core layer 6 that is arranged in contact with both the first part 6a of the InP-based core layer 6 and the second InP-based cladding layer 7 instead of depending on variations in both said second width profile, WP2, and the first width profile, WP1, of at least the first InP-based cladding layer 5 and the first part 6a of the InP-based core layer 6 that is arranged in contact with the first InP-based cladding layer 5.

It is noted that the angular increase of the second width profile, WP2, from the second width, W2, to the third width, W3, as shown in for example FIG. 1, most closely represents the rate of change of the effective refractive index in the hybridization region 12 along the hybridization length, Lh. If an angle having a value of 0.00477 degrees with an accuracy of ±0.00095 degrees is used for a second width, W2, having a value of 2.75 μm and a third width, W3, having a value of 2.85 μm, a mode conversion loss of at most −10 dB can be achieved.

FIG. 1 shows that the second waveguide section 23 of the elongated InP-based optical waveguide 4 comprises a seventh end part 24 and an eighth end part 25 that is arranged in optical connection with the third end part 14 of the second portion 13 of the first waveguide section 8. The second waveguide section 23 has a first cross-section that is symmetrical as seen in the direction transverse to both the elongated InP-based optical waveguide 4 and the support substrate 3 as shown in FIG. 2 regarding the third waveguide section 26. The first cross-section allows the second waveguide section 23 to support at least one of TM0, TE0, TM1 and TE1 modes.

The first InP-based cladding layer 5 and said first part 6a of the InP-based core layer 6 of the second waveguide section 23 have a seventh width profile, WP7, as seen in the direction transverse to the elongated InP-based optical waveguide 4 and parallel to the support substrate 3. The seventh width profile, WP7, has a twelfth value, W12, that is constant and equal to the fourth value, W4, of the third width profile, WP3, at the third end part 14 of the second portion 13 of the first waveguide section 8. In accordance with another embodiment of the PIC (not shown), also a part of the support substrate 3 can have the seventh width profile, WP7.

The second InP-based cladding layer 7 and said second part 6b of the InP-based core layer 6 of the second waveguide section 23 have an eighth width profile, WP8, as seen in the direction transverse to the elongated InP-based optical waveguide 4 and parallel to the support substrate 3. The eighth width profile, WP8, has a thirteenth value, W13, that is constant and equal to the sixth value, W6, of the fourth width profile, WP4, at the third end part 14 of the second portion 13 of the first waveguide section 8. It is noted that in accordance with yet another embodiment of the PIC (not shown), only the second InP-based cladding layer 7 can have the eighth width profile, WP8. In that case, said second part 6b of the InP-based core layer 6 also has the seventh width profile, WP7.

FIG. 1 shows that the third waveguide section 26 of the elongated InP-based optical waveguide 4 comprises a ninth end part 27 that is arranged in optical connection with the sixth end part 18 of the third portion 16 of the first waveguide section 8, and a tenth end part 28. The third waveguide section 26 has a second cross-section that is symmetrical as seen in the direction transverse to both the elongated InP-based optical waveguide 4 and the support substrate 3. This is shown in FIG. 2 and has been discussed above. The second cross-section allows the third waveguide section 26 to support at least one of TM0, TE0, TM1 and TE1 modes.

The first InP-based cladding layer 5 and said first part 6a of the InP-based core layer 6 of the third waveguide section 26 have a ninth width profile, WP9, as seen in the direction transverse to the elongated InP-based optical waveguide 4 and parallel to the support substrate 3. The ninth width profile, WP9, has a fourteenth value, W14, that is constant and equal to the ninth value, W9, of the fifth width profile, WP5, at the sixth end part 18 of the third portion 16 of the first waveguide section 8. In accordance with another embodiment of the PIC (not shown), also a part of the support substrate 3 can have the ninth width profile, WP9.

The second InP-based cladding layer 7 and said second part 6b of the InP-based core layer 6 of the third waveguide section 26 has a tenth width profile, WP10, as seen in the direction transverse to the elongated InP-based optical waveguide 4 and parallel to the support substrate 3. The tenth width profile, WP10, has a fifteenth value, W15, that is constant and equal to the eleventh value, W11, of the sixth width profile, WP6, at the sixth end part 18 of the third portion 16 of the first waveguide section 8. It is noted that in accordance with yet another embodiment of the PIC (not shown), only the second InP-based cladding layer 7 can have the tenth width profile, WP10. In that case, said second part 6b of the InP-based core layer 6 also has the ninth width profile, WP9.

FIG. 4 shows a schematic top view of a second exemplary, non-limiting embodiment of the PIC 1 according to the invention. The difference between the InP-based polarization rotators 2 shown in respectively FIG. 1 and FIG. 4, is that the fourth width profile, WP4, in the second portion 13 of the first waveguide section 8 of the elongated InP-based optical waveguide 4 of the InP-based polarization rotator 2 shown in FIG. 4 has a first part 19 that, as seen in a plane parallel to the support substrate 3, has a circumference that is hexagonally shaped and that has a first side 20 that is arranged at the third end part 14 of the second portion 13 of the first waveguide section 8. The first side 20 is equal to said sixth value, W6, at the third end part 14 of the second portion 13. FIG. 4 also shows that the sixth width profile, WP6, in the third portion 16 of the first waveguide section 8 of the elongated InP-based optical waveguide 4 has a second part 21 that, as seen in a plane parallel to the support substrate 3, has a circumference that is hexagonally shaped and that has a second side 22 that is arranged at the sixth end part 18 of the third portion 16 of the first waveguide section 8. The second side 22 is equal to said eleventh value, W11, at the sixth end part 18 of the third portion 16.

It is noted that the dashed lines opposite respectively the first side 20 and the second side 22 have only been included to highlight the hexagonally shaped circumferences of the first part 19 and the second part 21. It will be appreciated that depending on the actual shapes of the third width profile, WP3, and the fourth width profile, WP4, the circumference of the first part 19 can have any shape that is at least hexagonal. The same holds for the shape of the circumference of the second part 21 that depends on the actual shapes of the fifth width profile, WP5, and the sixth width profile, WP6. This will be further elucidated with reference to FIGS. 7C and 7H.

FIG. 5 shows a schematic top view of a first exemplary, non-limiting embodiment of an opto-electronic system 100 comprising a PIC 1 according to the present invention. The opto-electronic system 100 can for example, but not exclusively, be used for telecommunication applications, LIDAR or sensor applications. The opto-electronic system 100 can for example be one of a receiver, a transceiver, a coherent receiver and a coherent transceiver.

FIG. 6 shows a flow diagram of a first exemplary, non-limiting embodiment of the method 200 according to the invention. The steps 201-208 of this first exemplary, non-limiting embodiment of the method 200 are elucidated in FIGS. 7A-7K by showing the fabrication of a PIC 1 that comprises an InP-based polarization rotator 2 in accordance with the second exemplary, non-limiting embodiment of the PIC 1 shown in FIG. 4.

Figure 7A:
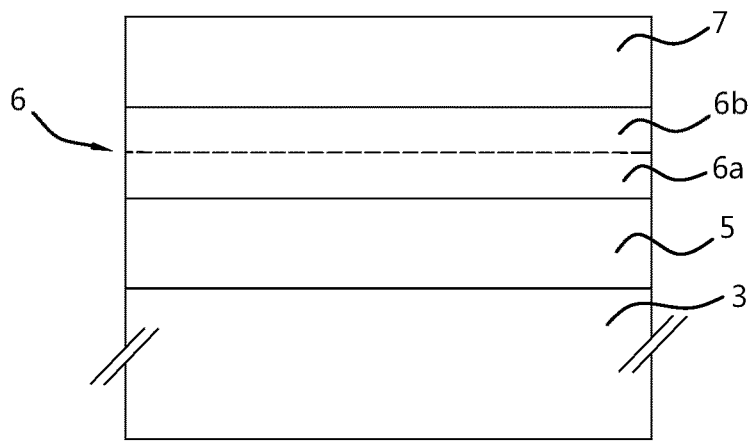

The method 200 comprises a first step 201 of providing the support substrate 3, the first InP-based cladding layer 5, the InP-based core layer 6 that comprises said first part 6a and said second part 6b, and the second InP-based cladding layer 7 for the elongated InP-based optical waveguide 4 of the InP-based polarization rotator 2 of the PIC 1. FIG. 7A shows a schematic cross-section of the afore-mentioned layer stack.

Figure 7B:
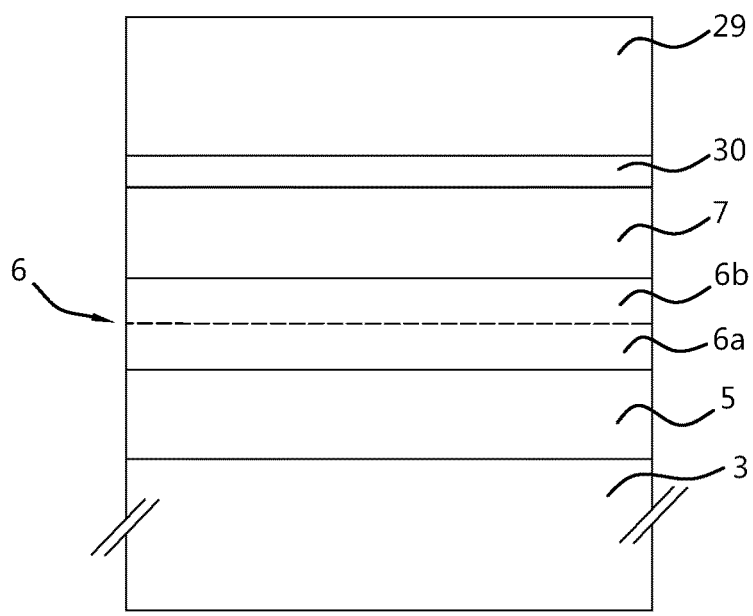

The method 200 comprises a second step 202 of providing a first masking layer 29 to cover the second InP-based cladding layer 7 or at least one protection layer 30 that is arranged to cover the second InP-based cladding layer 7. FIG. 7B shows a schematic cross-section of the layer stack shown in FIG. 7A, a protection layer 30 that is arranged to cover the second InP-based cladding layer 7, and the first masking layer 29 that is arranged to cover the protection layer 30.

The method 200 comprises a third step 203 of applying a first lithographic process to the first masking layer 29 to provide the first masking layer 29 with a first pattern 31 that comprises, as seen in the direction parallel to the support substrate 3, consecutively the eighth width profile, WP8, of the second waveguide section 23, the fourth width profile, WP4, the second width profile, WP2, and the sixth width profile, WP6, of the first waveguide section 8, and the tenth width profile, WP10, of the third waveguide section 26 of the elongated InP-based optical waveguide 4 of the InP-based polarization rotator 2. The first lithographic process results in areas of the protection layer 30 that are covered with the first masking layer 29 that is shaped in accordance with the first pattern 31, and uncovered areas of the protection layer 30.

Figure 7C:
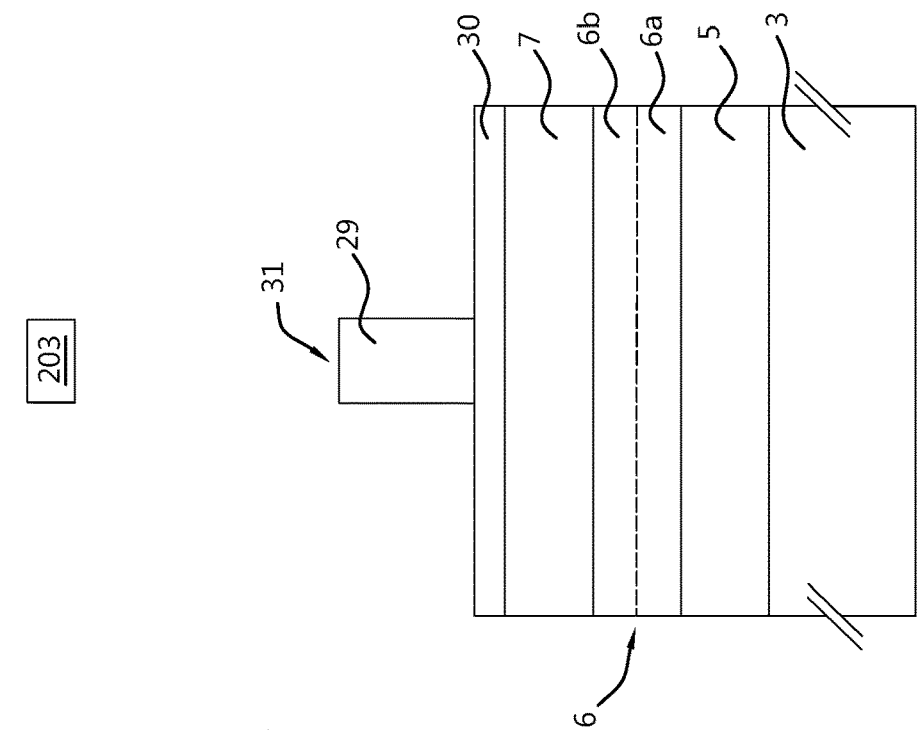

FIG. 7C shows a schematic top view of the first masking layer 29 that is shaped in accordance with the first pattern 31. FIG. 7C shows that the eighth width profile, WP8, has a linearly tapered shape that is strictly decreasing as seen in the direction towards the second portion 13 of the first waveguide section 8. The fourth width profile, WP4, has a piecewise linearly tapered shape, wherein a first linearly tapered part 50 is strictly increasing as seen in the direction towards the second waveguide section 23, and a second linearly tapered part 51 is strictly increasing as seen in the direction towards the first portion 9 of the first waveguide section 8. The second width profile, WP2, has a linearly tapered shape that is strictly increasing as seen in the direction towards the third portion 16 of the first waveguide section 8. The sixth width profile, WP6, also has a piecewise linearly tapered shape, wherein a first linearly tapered part 60 is strictly decreasing as seen in the direction towards the first portion 9 of the first waveguide section 8, and a second linearly tapered part 61 is strictly increasing as seen in the direction towards the third waveguide section 26. The tenth width profile, WP10, has a linearly tapered shape that is strictly decreasing as seen in the direction towards the third portion 16 of the first waveguide section 8. It is noted that the sizes of respectively the first linearly tapered part 50 of the fourth width profile, WP4, the eight width profile, WP8, the first linearly tapered part 60 of the sixth width profile, WP6, and the tenth width profile, WP10, have been greatly exaggerated for the sake of clarity. Their respective actual sizes in a fabricated polarization rotator of a PIC according to the invention are not expected to compromise the performance of the PIC.

Figure 7D:
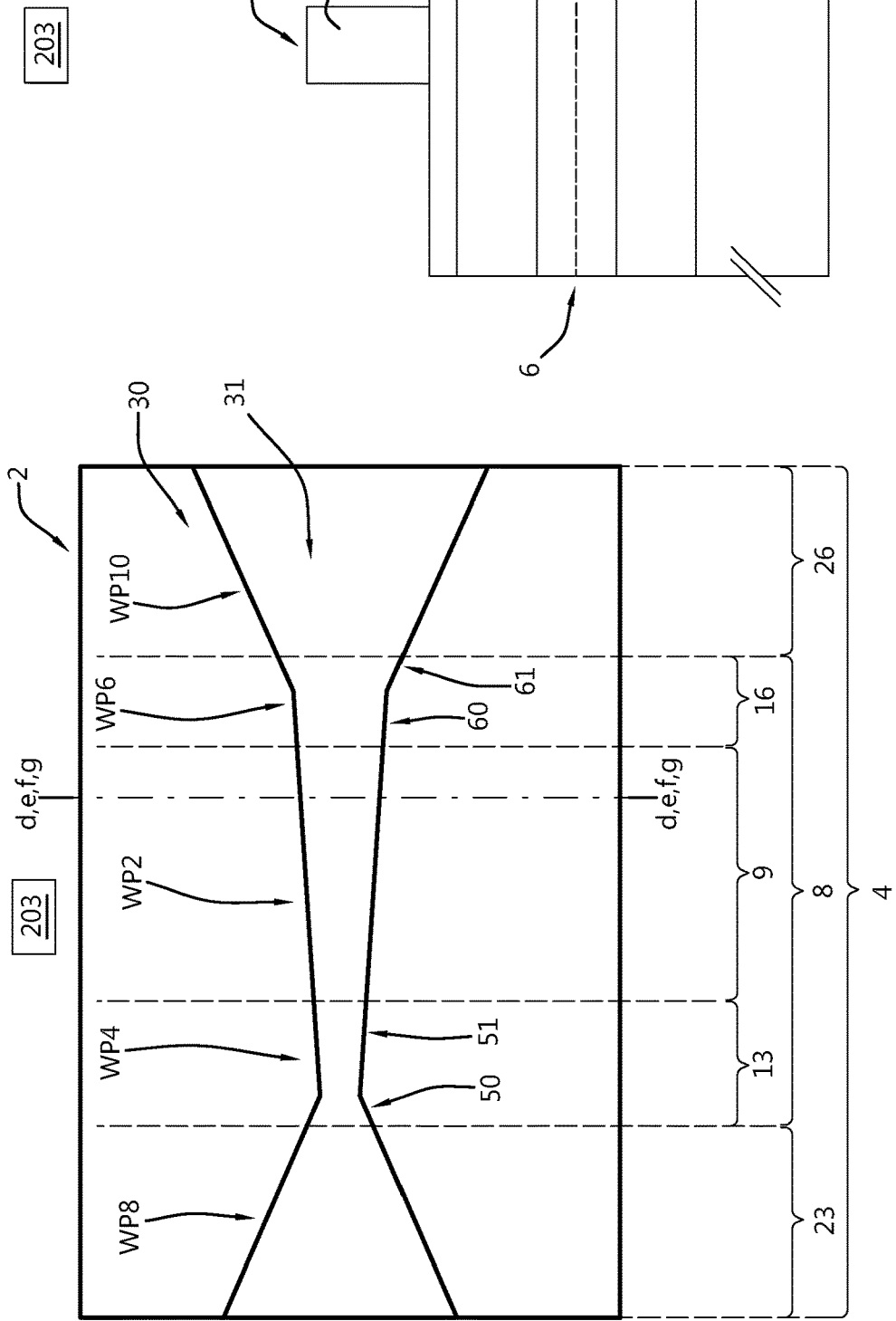

FIG. 7D shows a schematic cross-section of the support substrate 3, the first InP-based cladding layer 5, the InP-based core layer 6 that comprises said first part 6a and said second part 6b, the second InP-based cladding layer 7, the protection layer 30, and the first masking layer 29 that is shaped in accordance with the first pattern 31 at the location of the first portion 9 of the first waveguide section 8 of the elongated InP-based optical waveguide 4 of the InP-based polarization rotator 2.

The method 200 comprises a fourth step 204 of applying a first dry etch to the first masking layer 29 and the uncovered areas of the protection layer 30 for transferring the first pattern 31 to the protection layer 30, the second InP-based cladding layer 7 and said second part 6b of the InP-based core layer 6. The first dry etch results in an etched first masking layer 29, and first etched areas 32 of InP-based material at a first etch depth, d1, relative to unetched areas 33 of the protection layer 30. The person skilled in the art will appreciate that the first dry etch is commonly referred to as a shallow etch. The first, shallow, dry etch can for example be performed using reactive ion etching.

Figure 7E:
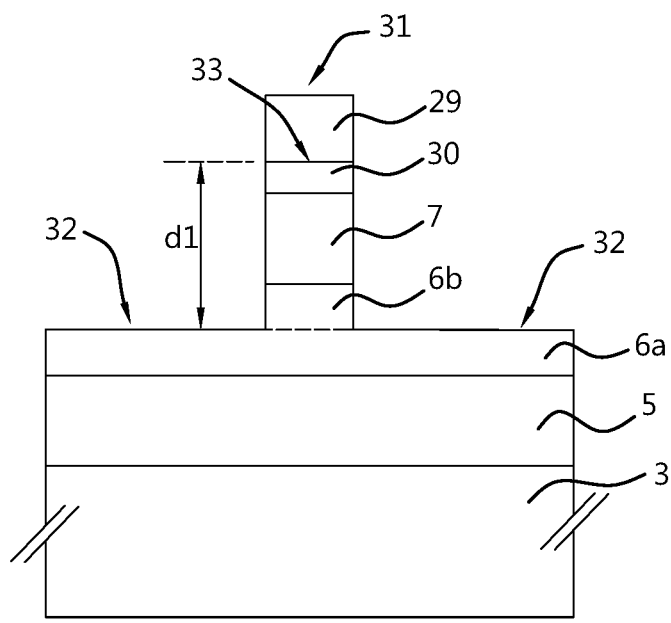

FIG. 7E shows a schematic cross-section of the support substrate 3, the first InP-based cladding layer 5, the first part 6a of the InP-based core layer 6, the partially etched second part 6b of the InP-based core layer 6, the partially etched second InP-based cladding layer 7, the partially etched protection layer 30, and the etched first masking layer 29 at the location of the first portion 9 of the first waveguide section 8 of the elongated InP-based optical waveguide 4 of the InP-based polarization rotator 2. FIG. 7E also shows the first etched areas 32 of the InP-based material at the first etch depth, d1, relative to unetched areas 33 of the protection layer 30. Furthermore, FIG. 7E shows that the etched first masking layer 29 has a reduced thickness compared to the unetched first masking layer 29 shown in FIG. 7D.

Figure 7F:
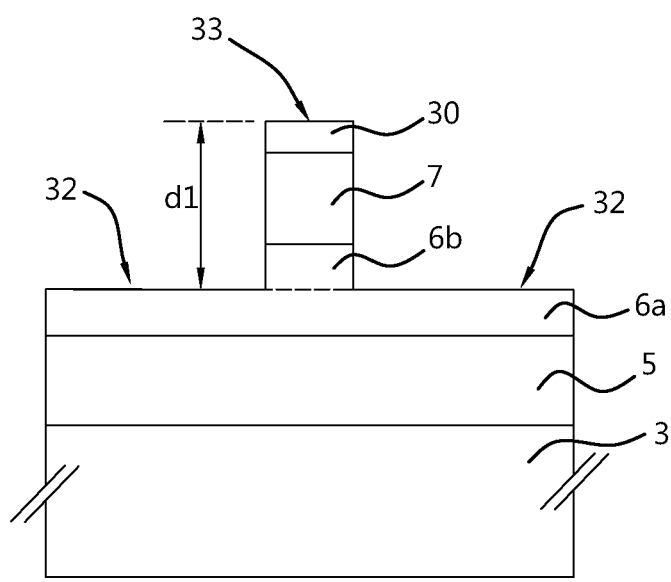

The method 200 comprises a fifth step 205 of removing the etched first masking layer 29 from unetched areas 33 of the protection layer 30. FIG. 7F shows a schematic cross-section of the support substrate 3, the first InP-based cladding layer 5, the first part 6a of the InP-based core layer 6, the partially etched second part 6b of the InP-based core layer 6, the partially etched second InP-based cladding layer 7, and the partially etched protection layer 30 at the location of the first portion 9 of the first waveguide section 8 of the elongated InP-based optical waveguide 4 of the InP-based polarization rotator 2. FIG. 7F also shows the first etched areas 32 of the InP-based material at the first etch depth, d1, relative to unetched areas 33 of the protection layer 30 from which the etched first masking layer 29 has been removed.

It is noted that the etched first masking layer 29 can be removed using any suitable removal technique depending on the material properties of the masking layer. The person skilled in the art will appreciate that in some cases for example a wet chemical process, a dry chemical process or any suitable combination thereof might be used. In some cases it might even be possible to use a removal technique that solely relies on physical removal of the masking material constituting the first masking layer 29.

Figure 7G:
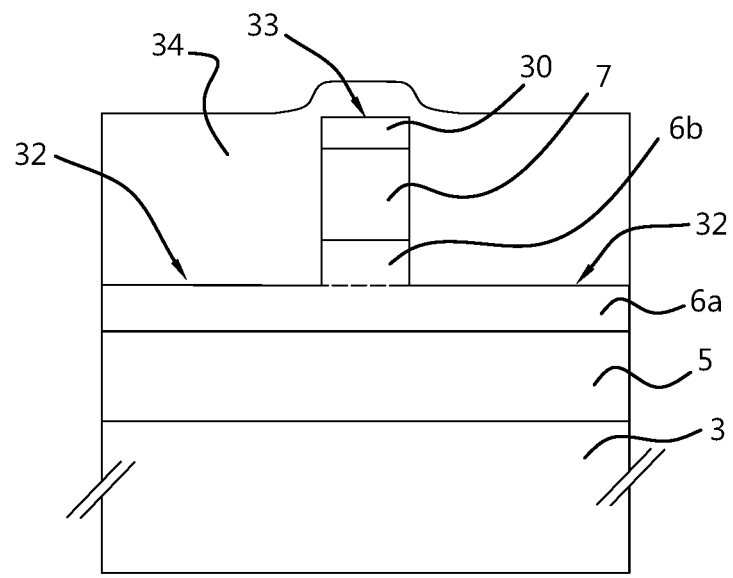

The method 200 comprises a sixth step 206 of providing a second masking layer 34 to cover the first etched areas 32 of InP-based material and the unetched areas 33 of the protection layer 30. FIG. 7G shows a schematic cross-section of the support substrate 3, the first InP-based cladding layer 5, the first part 6a of the InP-based core layer 6, the partially etched second part 6b of the InP-based core layer 6, the partially etched second InP-based cladding layer 7, the partially etched protection layer 30, and the second masking layer 34 that covers the first etched areas 32 of InP-based material and the unetched areas 33 of the protection layer 30 at the location of the first portion 9 of the first waveguide section 8 of the elongated InP-based optical waveguide 4 of the InP-based polarization rotator 2.

The method 200 comprises a seventh step 207 of applying a second lithographic process to the second masking layer 34 to provide the second masking layer 34 with a second pattern 35 that comprises, as seen in the direction parallel to said eighth width profile, WP8, of the second waveguide section 23, said fourth width profile, WP4, said second width profile, WP2, and said sixth width profile, WP6, of the first waveguide section 8, and said tenth width profile, WP10, of the third waveguide section 26 of the elongated InP-based optical waveguide 4, consecutively the seventh width profile, WP7, of the second waveguide section 23, the third width profile, WP3, the first width profile, WP1, and the fifth width profile, WP5, of the first waveguide section 8, and the ninth width profile, WP9, of the third waveguide section 26 of the elongated InP-based optical waveguide 4 of the InP-based polarization rotator 2. Regarding the second exemplary, non-limiting embodiment of the PIC 1 that is used to illustrate the method 200 according to the invention, the second lithographic process results on the one hand in parts of the unetched areas 33 of the protection layer 30, and parts 36 of the first etched areas 32 of InP-based material being covered with the second masking layer 34 that is shaped in accordance with the second pattern 35, and on the other hand in uncovered parts 37 of the first etched areas 32 of InP-based material, and uncovered parts 38 of the unetched areas 33 of the protection layer 30.

FIG. 7H shows a schematic top view of the second masking layer 34 that is shaped in accordance with the second pattern 35. FIG. 7H shows that the seventh width profile, WP7, has a constant width that is equal to the twelfth value, W12. The third width profile, WP3, has a linearly tapered shape that is strictly increasing as seen in the direction towards the first portion 9 of the first waveguide section 8. The first width profile, WP1, has a constant width that is equal to the first value, W1. The fifth width profile, WP5, has a linearly tapered shape that is strictly decreasing as seen in the direction towards the third waveguide section 26. The ninth width profile, WP9, has a constant width that is equal to the fourteenth value, W14.

FIG. 7I shows a schematic cross-section of the support substrate 3, the first InP-based cladding layer 5, the first part 6a of the InP-based core layer 6, the partially etched second part 6b of the InP-based core layer 6, the partially etched second InP-based cladding layer 7, the partially etched protection layer 30, and the second masking layer 34 that is shaped in accordance with the second pattern 35 at the location of the first portion 9 of the first waveguide section 8 of the elongated InP-based optical waveguide 4 of the InP-based polarization rotator 2. FIG. 7I also shows the parts 36 of the first etched areas 32 of InP-based material that are covered with the second masking layer 34 that is shaped in accordance with the second pattern 35, and the uncovered parts 37 of the first etched areas 32 of InP-based material.

The method 200 comprises an eighth step 208 of applying a second dry etch to the second masking layer 34, the uncovered parts 37 of the first etched areas 32 of InP-based material, and the uncovered parts 38 of the unetched areas 33 of the protection layer 30. Regarding the second exemplary, non-limiting embodiment of the PIC 1 that is used to illustrate the method 200 according to the invention, the second dry etch results in transferring the second pattern 35 to the first InP-based cladding layer 5 and said first part 6a of the InP-based core layer 6, thereby obtaining an etched second masking layer 34, and second etched areas 40 of InP-based material at a second etch depth, d2, relative to the unetched areas 33 of the protection layer 30. The second etch depth, d2, being larger than the first etch depth, d1.

FIG. 7J shows a schematic top view of the etched elongated InP-based optical waveguide 4 of the InP-based polarization rotator 2 in accordance with the second exemplary, non-limiting embodiment of the PIC 1. The etched elongated InP-based optical waveguide 4 is still covered with the etched second masking layer 34. The hexagonal shapes of the first part 19 of the fourth width profile, WP4, and of the second part 21 of the sixth width profile, WP6, result after exposure of the unprotected sacrificial parts 38 of the unetched areas 33 of the protection layer 30 that are shown in FIG. 7H to the second dry etch. The unprotected sacrificial parts 38 that were removed during the second dry etch enabled accommodating any overlay errors in the direction transverse to the elongated InP-based optical waveguide 4 and parallel to the support substrate 3 that are caused by misalignment during the lithographic process in which the masking layer 34 is provided with the second pattern 35. The person skilled in the art will appreciate that the second dry etch is commonly referred to as a deep etch. The second, deep, etch can for example be performed using inductively coupled plasma etching. By accommodating the abovementioned overlay errors, non-optimal waveguide cross sections of the second waveguide section 23 and the third waveguide section 26 of the elongated InP-based optical waveguide 4 can at least be reduced and ideally be prevented. As a result, unpredictable mode profiles in the second waveguide section 23 and the third waveguide section 26 that can have a negative effect on the yield of the PIC 1 can at least be reduced and ideally be prevented.

FIG. 7K shows a schematic cross-section of the support substrate 3, the first InP-based cladding layer 5 and the first part 6a of the InP-based core layer 6 that are etched in accordance with the second pattern 35, the second part 6b of the InP-based core layer 6, the second InP-based cladding layer 7, and the protection layer 30 that are etched in accordance with the first pattern 31, and the second masking layer 34 that is etched in accordance with the second pattern 35 at the location of the first portion 9 of the first waveguide section 8 of the elongated InP-based optical waveguide 4 of the InP-based polarization rotator 2. FIG. 7K also shows that due to the second, deep, dry etch, the second masking layer 34 has a reduced thickness compared to the second masking layer 34 that is shown in FIG. 7I. FIG. 7K also shows the second etched areas 40 of InP-based material at the second etch depth, d2, relative to the unetched areas 33 of the protection layer 30. The second etch depth, d2, is larger than the first etch depth, d1, at which the first etched areas 36 of InP-based material are arranged. It is noted that in accordance with a further embodiment of the PIC 1 (not shown), the second, deep, dry etch can also extend into the support substrate 3, i.e. beyond the first InP-based cladding layer 5.

In addition, it is noted that the etched second masking layer 34 can be removed using any suitable removal technique depending on the material properties of the masking layer. The person skilled in the art will appreciate that in some cases for example a wet chemical process, a dry chemical process or any suitable combination thereof might be used. In some cases it might even be possible to use a removal technique that solely relies on physical removal of the masking material constituting the second masking layer 34. Removing the etched second masking layer 34 can be advantageous for reducing reliability issues caused for example by trapping of moisture in the etched second masking layer 34.

The present invention can be summarized as relating to a PIC 1 that comprises an InP-based polarization rotator 2 having an improved design that enables at least one of an improved performance and an improved yield of the PIC due to at least one of reduced variations in critical dimensions of the InP-based polarization rotator and reduced overlay errors during fabrication of the InP-based polarization rotator of the PIC. The invention further relates to an opto-electronic system 100 comprising said PIC. The invention also relates to a method 200 of fabricating the PIC that comprises the InP-based polarization rotator having the improved design.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

What is claimed is:

1. A photonic integrated circuit, PIC, comprising: an InP-based polarization rotator that has a support substrate, the InP-based polarization rotator comprising an elongated InP-based optical waveguide that comprises:
   a first InP-based cladding layer that is at least a part of the support substrate or an epitaxial InP-based layer that is arranged to at least partially cover the support substrate;
   an InP-based core layer that is arranged to cover the first InP-based cladding layer; and
   a second InP-based cladding layer that is arranged to at least partially cover the InP-based core layer;

wherein the elongated InP-based optical waveguide is configured and arranged to have:
  a first waveguide section that comprises:
    a first portion that has a first end part and a second end part, wherein:
      at least the first InP-based cladding layer and a first part of the InP-based core layer that is arranged in contact with the first InP-based cladding layer have a first width profile, WP1, as seen in a direction transverse to the elongated InP-based optical waveguide and parallel to the support substrate, the first width profile, WP1, having a first value, W1, that is constant;
      the second InP-based cladding layer or the second InP-based cladding layer and a second part of the InP-based core layer that is arranged in contact with both the first part of the InP-based core layer and the second InP-based cladding layer have a second width profile, WP2, as seen in the direction transverse to the elongated InP-based optical waveguide and parallel to the support substrate, the second width profile, WP2, having:
        a second value, W2, at the first end part of the first portion, the second value, W2 being smaller than the first value, W1, of the first width profile, WP1; and
        a third value, W3, at the second end part of the first portion, the third value, W3, being larger than the second value, W2, and smaller than the first value, W1, of the first width profile, WP1; and
      the first width profile, WP1, and the second width profile, WP2, are configured and arranged to provide the first portion with a hybridization region in which the elongated InP-based optical waveguide has effective refractive index values along a hybridization length, Lh, as seen in a direction parallel to the elongated InP-based optical waveguide, said effective refractive index values enabling a conversion of a lower order TM mode into a higher order TE mode in the hybridization region with a mode conversion loss of at most −10 dB;
    a second portion having a third end part and a fourth end part that is arranged in optical connection with the first end part of said first portion, wherein:
      at least the first InP-based cladding layer and said first part of the InP-based core layer have a third width profile, WP3, as seen in the direction transverse to the elongated InP-based optical waveguide and parallel to the support substrate, the third width profile, W3, having:
        a fourth value, W4, at the third end part of the second portion, the fourth value, W4, being smaller than the first value, W1, of the first width profile, WP1, in the first portion; and
        a fifth value, W5, at the fourth end part of the second portion, the fifth value, W5, being equal to the first value, W1, of the first width profile, WP1, in the first portion; and
      the second InP-based cladding layer or the second InP-based cladding layer and said second part of the InP-based core layer have a fourth width profile, WP4, as seen in the direction transverse to the elongated InP-based optical waveguide and parallel to the support substrate, the fourth width profile, WP4, having:
        a sixth value, W6, at the third end part of the second portion, the sixth value, W6, being equal to the fourth value, W4, of the third width profile, WP3; and
        a seventh value, W7, at the fourth end part of the second portion, the seventh value, W7, being equal to the second value, W2, of the second width profile, WP2, in the first portion; and
    a third portion having a fifth end part that is arranged in optical connection with the second end part of said first portion, and a sixth end part, wherein:
      at least the first InP-based cladding layer and said first part of the InP-based core layer have a fifth width profile, WP5, as seen in the direction transverse to the elongated InP-based optical waveguide and parallel to the support substrate, the fifth width profile, WP5, having:
        an eighth value, W8, at the fifth end part of the third portion, the eighth value, W8, being equal to the first value, W1, of the first width profile, WP1, in the first portion; and
        a ninth value, W9, at the sixth end part of the third portion, the ninth value, W9, being smaller than the eighth value, W8, and larger than the fourth value, W4, of the third width profile, WP3, in the second portion; and
      the second InP-based cladding layer or the second InP-based cladding layer and said second part of the InP-based core layer have a sixth width profile, WP6, as seen in the direction transverse to the elongated InP-based optical waveguide and parallel to the support substrate, the sixth width profile, WP6, having:
        a tenth value, W10, at the fifth end part of the third portion, the tenth value, W10, being equal to the third value, W3, of the second width profile, WP2, in the first portion; and
        an eleventh value, W11, at the sixth end part of the third portion, the eleventh value, W11, being equal to the ninth value, W9, of the fifth width profile, WP5;
  a second waveguide section that comprises a seventh end part, an eighth end part that is arranged in optical connection with the third end part of the second portion of the first waveguide section, and a first cross-section that is symmetrical as seen in a direction transverse to both the elongated InP-based optical waveguide and the support substrate, the first cross-section allowing the second waveguide section to support at least one of TM0, TE0, TM1 and TE1 modes; and
  a third waveguide section that comprises a ninth end part that is arranged in optical connection with the sixth end part of the third portion of the first waveguide section, a tenth end part, and a second cross-section that is symmetrical as seen in the direction transverse to both the elongated InP-based optical waveguide and the support substrate, the second cross-section allowing the third waveguide section to support at least one of TM0, TE0, TM1 and TE1 modes.

2. The PIC according to claim 1, wherein:
the third width profile, WP3, in the second portion of the first waveguide section has a linearly tapered shape or an adiabatically tapered shape between the fourth value, W4, at the third end part of the second portion and the fifth value, W5, at the fourth end part of the second portion; and the fifth width profile, WP5, in the third portion of the first waveguide section has a linearly tapered shape or an adiabatically tapered shape between the eighth value, W8, at the fifth end part of the third portion and the ninth value, W9, at the sixth end part of the third portion.

3. The PIC according to claim 1, wherein:
the second width profile, WP2, in the first portion of the first waveguide section has a linearly tapered shape or an adiabatically tapered shape between the second value, W2, at the first end part of the first portion and the third value, W3, at the second end part of the first portion;
the fourth width profile, WP4, in the second portion of the first waveguide section has a linearly tapered shape or an adiabatically tapered shape between the sixth value, W6, at the third end part of the second portion and said seventh value, W7, at the fourth end part of the second portion; and
the sixth width profile, WP6, in the third portion of the first waveguide section has a linearly tapered shape or an adiabatically tapered shape between the tenth value, W10, at the fifth end part of the third portion and the eleventh value, W11, at the sixth end part of the third portion.

4. The PIC according to claim 1, wherein:
the second width profile, WP2, in the first portion of the first waveguide section has a linearly tapered shape or an adiabatically tapered shape between the second value, W2, at the first end part of the first portion and the third value, W3, at the second end part of the first portion;
the third width profile, WP3, in the second portion of the first waveguide section has a linearly tapered shape or an adiabatically tapered shape between the fourth value, W4, at the third end part of the second portion and the fifth value, W5, at the fourth end part of the second portion;
the fourth width profile, WP4, in the second portion of the first waveguide section has a linearly tapered shape or an adiabatically tapered shape between the sixth value, W6, at the third end part of the second portion and the seventh value, W7, at the fourth end part of the second portion;
the fifth width profile, WP5, in the third portion of the first waveguide section has a linearly tapered shape or an adiabatically tapered shape between the eighth value, W8, at the fifth end part of the third portion and the ninth value, W9, at the sixth end part of the third portion; and
the sixth width profile, WP6, in the third portion of the first waveguide section has a linearly tapered shape or an adiabatically tapered shape between the tenth value, W10, at the fifth end part of the third portion and the eleventh value, W11, at the sixth end part of the third portion.

5. The PIC according to claim 1, wherein:
the fourth width profile, WP4, in the second portion of the first waveguide section has a first part that, as seen in a plane parallel to the support substrate, has a circumference that is at least hexagonally shaped and that has a first side, said first side being arranged at the third end part of the second portion and being equal to said sixth value, W6, at the third end part of the second portion; and
the sixth width profile, WP6, in the third portion of the first waveguide section has a second part that, as seen in a plane parallel to the support substrate, has a circumference that is at least hexagonally shaped and that has a second side, said second side being arranged at the sixth end part of the third portion and being equal to said eleventh value, W11, at the sixth end part of the third portion.

6. The PIC according to claim 2, wherein:
the fourth width profile, WP4, in the second portion of the first waveguide section has a first part that, as seen in a plane parallel to the support substrate, has a circumference that is at least hexagonally shaped and that has a first side, said first side being arranged at the third end part of the second portion and being equal to said sixth value, W6, at the third end part of the second portion; and
the sixth width profile, WP6, in the third portion of the first waveguide section has a second part that, as seen in a plane parallel to the support substrate, has a circumference that is at least hexagonally shaped and that has a second side, said second side being arranged at the sixth end part of the third portion and being equal to said eleventh value, W11, at the sixth end part of the third portion.

7. The PIC according to claim 3, wherein:
the fourth width profile, WP4, in the second portion of the first waveguide section has a first part that, as seen in a plane parallel to the support substrate, has a circumference that is at least hexagonally shaped and that has a first side, said first side being arranged at the third end part of the second portion and being equal to said sixth value, W6, at the third end part of the second portion; and
the sixth width profile, WP6, in the third portion of the first waveguide section has a second part that, as seen in a plane parallel to the support substrate, has a circumference that is at least hexagonally shaped and that has a second side, said second side being arranged at the sixth end part of the third portion and being equal to said eleventh value, at the sixth end part of the third portion.

8. The PIC according to claim 4, wherein:
the fourth width profile, WP4, in the second portion of the first waveguide section has a first part that, as seen in a plane parallel to the support substrate, has a circumference that is at least hexagonally shaped and that has a first side, said first side being arranged at the third end part of the second portion and being equal to said sixth value, W6, at the third end part of the second portion; and
the sixth width profile, WP6, in the third portion of the first waveguide section has a second part that, as seen in a plane parallel to the support substrate, has a circumference that is at least hexagonally shaped and that has a second side, said second side being arranged at the sixth end part of the third portion and being equal to said eleventh value, W11, at the sixth end part of the third portion.

9. The PIC according to claim 1, wherein as seen in the direction parallel to the elongated InP-based optical waveguide:
the first portion of the first waveguide section has a first length, L1, that is larger than the hybridization length, Lh, the first length, L1, being in a first range from 450 μm to 750 μm or in a second range from 1450 μm to 1750 μm;

the second portion of the first waveguide section has a second length, L2, that is in a third range from 20 µm to 100 µm; and
the third portion of the first waveguide section has a third length, L3, that is in the third range from 20 µm to 100 µm.

10. The PIC according to claim 1, wherein:
at least the first InP-based cladding layer and said first part of the InP-based core layer of the second waveguide section have a seventh width profile, WP7, as seen in the direction transverse to the elongated InP-based optical waveguide and parallel to the support substrate, the seventh width profile, WP7, having a twelfth value, W12, that is equal to the fourth value, W4, of the third width profile, WP3, at the third end part of the second portion of the first waveguide section;
the second InP-based cladding layer or the second InP-based cladding layer and said second part of the InP-based core layer of the second waveguide section have an eighth width profile, WP8, as seen in the direction transverse to the elongated InP-based optical waveguide and parallel to the support substrate, the eighth width profile, WP8, having a thirteenth value, W13, that is equal to the sixth value, W6, of the fourth width profile, WP4, at the third end part of the second portion of the first waveguide section; and
at least the first InP-based cladding layer and said first part of the InP-based core layer of the third waveguide section have a ninth width profile, WP9, as seen in the direction transverse to the elongated InP-based optical waveguide and parallel to the support substrate, the ninth width profile, WP9, having a fourteenth value, W14, that is equal to the ninth value, W9, of the fifth width profile, WP5, at the sixth end part of the third portion of the first waveguide section;
the second InP-based cladding layer or the second InP-based cladding layer and said second part of the InP-based core layer of the third waveguide section has a tenth width profile, WP10, as seen in the direction transverse to the elongated InP-based optical waveguide and parallel to the support substrate, the tenth width profile, WP10, having a fifteenth value, W15, that is equal to the eleventh value, W11, of the sixth width profile, WP6, at the sixth end part of the third portion of the first waveguide section.

11. The PIC according to claim 1, wherein the InP-based core layer comprises InGaAsP material.

12. The PIC according to claim 1, wherein the PIC is a hybrid PIC.

13. The PIC according to claim 1, wherein the PIC is an InP-based monolithic PIC.

14. An opto-electronic system comprising the PIC according to claim 1.

15. A method of fabricating a PIC that comprises an InP-based polarization rotator that has a support substrate, the InP-based polarization rotator comprising an elongated InP-based optical waveguide that comprises:
a first InP-based cladding layer that is at least a part of the support substrate or an epitaxial InP-based layer that is arranged to at least partially cover the support substrate;
an InP-based core layer that is arranged to cover the first InP-based cladding layer; and
a second InP-based cladding layer that is arranged to at least partially cover the InP-based core layer;
wherein the elongated InP-based optical waveguide is configured and arranged to have:
a first waveguide section that comprises:
a first portion that has a first end part and a second end part, wherein:
at least the first InP-based cladding layer and a first part of the InP-based core layer that is arranged in contact with the first InP-based cladding layer have a first width profile, WP1, as seen in a direction transverse to the elongated InP-based optical waveguide and parallel to the support substrate, the first width profile, WP1, having a first value, W1, that is constant;
the second InP-based cladding layer or the second InP-based cladding layer and a second part of the InP-based core layer that is arranged in contact with both the first part of the InP-based core layer and the second InP-based cladding layer have a second width profile, WP2, as seen in the direction transverse to the elongated InP-based optical waveguide and parallel to the support substrate, the second width profile, WP2, having:
a second value, W2, at the first end part of the first portion, the second value, W2 being smaller than the first value, W1, of the first width profile, WP1; and
■ a third value, W3, at the second end part of the first portion, the third value, W3, being larger than the second value, W2, and smaller than the first value, W1, of the first width profile, WP1; and
the first width profile, WP1, and the second width profile, WP2, are configured and arranged to provide the first portion with a hybridization region in which the elongated InP-based optical waveguide has effective refractive index values along a hybridization length, Lh, as seen in a direction parallel to the elongated InP-based optical waveguide, said effective refractive index values enabling a conversion of a lower order TM mode into a higher order TE mode in the hybridization region with a mode conversion loss of at most −10 dB;
a second portion having a third end part and a fourth end part that is arranged in optical connection with the first end part of said first portion, wherein:
at least the first InP-based cladding layer and said first part of the InP-based core layer have a third width profile, WP3, as seen in the direction transverse to the elongated InP-based optical waveguide and parallel to the support substrate, the third width profile, W3, having:
a fourth value, W4, at the third end part of the second portion, the fourth value, W4, being smaller than the first value, W1, of the first width profile, WP1, in the first portion; and
a fifth value, W5, at the fourth end part of the second portion, the fifth value, W5, being equal to the first value, W1, of the first width profile, WP1, in the first portion; and
the second InP-based cladding layer or the second InP-based cladding layer and said second part of the InP-based core layer have a fourth width profile, WP4, as seen in the direction transverse to the elongated InP-based optical waveguide and parallel to the support substrate, the fourth width profile, WP4, having:

a sixth value, W6, at the third end part of the second portion, the sixth value, W6, being equal to the fourth value, W4, of the third width profile, WP3; and
a seventh value, W7, at the fourth end part of the second portion, the seventh value, W7, being equal to the second value, W2, of the second width profile, WP2, in the first portion; and
a third portion having a fifth end part that is arranged in optical connection with the second end part of said first portion, and a sixth end part, wherein:
at least the first InP-based cladding layer and said first part of the InP-based core layer have a fifth width profile, WP5, as seen in the direction transverse to the elongated InP-based optical waveguide and parallel to the support substrate, the fifth width profile, WP5, having:
an eighth value, W8, at the fifth end part of the third portion, the eighth value, W8, being equal to the first value, W1, of the first width profile, WP1, in the first portion; and
a ninth value, W9, at the sixth end part of the third portion, the ninth value, W9, being smaller than the eighth value, W8, and larger than the fourth value, W4, of the third width profile, WP3, in the second portion; and
the second InP-based cladding layer or the second InP-based cladding layer and said second part of the InP-based core layer have a sixth width profile, WP6, as seen in the direction transverse to the elongated InP-based optical waveguide and parallel to the support substrate, the sixth width profile, WP6, having:
a tenth value, W10, at the fifth end part of the third portion, the tenth value, W10, being equal to the third value, W3, of the second width profile, WP2, in the first portion; and
an eleventh value, W11, at the sixth end part of the third portion, the eleventh value, W11, being equal to the ninth value, W9, of the fifth width profile, WP5;
a second waveguide section that comprises:
a seventh end part;
an eighth end part that is arranged in optical connection with the third end part of the second portion of the first waveguide section; and
a first cross-section that is symmetrical as seen in a direction transverse to both the elongated InP-based optical waveguide and the support substrate, the first cross-section allowing the second waveguide section to support at least one of TM0, TE0, TM1 and TE1 modes;
wherein:
at least the first InP-based cladding layer and said first part of the InP-based core layer of the second waveguide section have a seventh width profile, WP7, as seen in the direction transverse to the elongated InP-based optical waveguide and parallel to the support substrate, the seventh width profile, WP7, having a twelfth value, W12, that is equal to the fourth value, W4, of the third width profile, WP3, at the third end part of the second portion of the first waveguide section; and
the second InP-based cladding layer or the second InP-based cladding layer and said second part of the InP-based core layer of the second waveguide section have an eighth width profile, WP8, as seen in the direction transverse to the elongated InP-based optical waveguide and parallel to the support substrate, the eighth width profile, WP8, having a thirteenth value, W13, that is equal to the sixth value, W6, of the fourth width profile, WP4, at the third end part of the second portion of the first waveguide section; and
a third waveguide section that comprises:
a ninth end part that is arranged in optical connection with the sixth end part of the third portion of the first waveguide section;
a tenth end part; and
a second cross-section that is symmetrical as seen in the direction transverse to both the elongated InP-based optical waveguide and the support substrate, the second cross-section allowing the third waveguide section to support at least one of TM0, TE0, TM1 and TE1 modes;
wherein:
at least the first InP-based cladding layer and said first part of the InP-based core layer of the third waveguide section have a ninth width profile, WP9, as seen in the direction transverse to the elongated InP-based optical waveguide and parallel to the support substrate, the ninth width profile, WP9, having a fourteenth value, W14, that is equal to the ninth value, W9, of the fifth width profile, WP5, at the sixth end part of the third portion of the first waveguide section; and
the second InP-based cladding layer or the second InP-based cladding layer and said second part of the InP-based core layer of the third waveguide section has a tenth width profile, WP10, as seen in the direction transverse to the elongated InP-based optical waveguide and parallel to the support substrate, the tenth width profile, WP10, having a fifteenth value, W15, that is equal to the eleventh value, W11, of the sixth width profile, WP6, at the sixth end part of the third portion of the first waveguide section;
wherein the method comprises:
providing the support substrate, said first InP-based cladding layer, said InP-based core layer, and said second InP-based cladding layer for the elongated InP-based optical waveguide of the InP-based polarization rotator;
providing a first masking layer to cover the second InP-based cladding layer or at least one protection layer that is arranged to cover the second InP-based cladding layer;
applying a first lithographic process to the first masking layer to provide the first masking layer with a first pattern that comprises, as seen in the direction parallel to the support substrate, consecutively said eighth width profile, WP8, of the second waveguide section, said fourth width profile, WP4, said second width profile, WP2, and said sixth width profile, WP6, of the first waveguide section, and said tenth width profile, WP10, of the third waveguide section of the elongated InP-based optical waveguide, thereby obtaining:
areas of the second InP-based cladding layer or said at least one protection layer that is arranged to cover the second InP-based cladding layer that are covered with the first masking layer that is shaped in accordance with the first pattern; and
uncovered areas of the second InP-based cladding layer or said at least one protection layer that is arranged to cover the second InP-based cladding layer;

applying a first dry etch to the first masking layer and the uncovered areas of the second InP-based cladding layer or said at least one protection layer that is arranged to cover the second InP-based cladding layer for transferring the first pattern to at least one of the second InP-based cladding layer and the second part of the InP-based core layer that is arranged in contact with the second InP-based cladding layer, thereby obtaining:
  an etched first masking layer; and
  first etched areas of InP-based material at a first etch depth, d1, relative to the unetched areas of the second InP-based cladding layer or said at least one protection layer that is arranged to cover the second InP-based cladding layer;
removing the etched first masking layer from unetched areas of the second InP-based cladding layer or said at least one protection layer that is arranged to cover the second InP-based cladding layer;
providing a second masking layer to cover the first etched areas of InP-based material and the unetched areas of the second InP-based cladding layer or said at least one protection layer that is arranged to cover the second InP-based cladding layer;
applying a second lithographic process to the second masking layer to provide the second masking layer with a second pattern that comprises, as seen in the direction parallel to said eighth width profile, WP8, of the second waveguide section, said fourth width profile, WP4, said second width profile, WP2, and said sixth width profile, WP6, of the first waveguide section, and said tenth width profile, WP10, of the third waveguide section of the elongated InP-based optical waveguide, consecutively said seventh width profile, WP7, of the second waveguide section, said third width profile, WP3, said first width profile, WP1, and said fifth width profile, WP5, of the first waveguide section, and said ninth width profile, WP9, of the third waveguide section of the elongated InP-based optical waveguide, thereby obtaining:
  the second masking layer that is shaped in accordance with the second pattern covering:
    at least parts of the unetched areas of the second InP-based cladding layer or said at least one protection layer that is arranged to cover the second InP-based cladding layer; and
    parts of the first etched areas of InP-based material;
  uncovered parts of the first etched areas of InP-based material; and
  uncovered parts of the unetched areas of the second InP-based cladding layer or said at least one protection layer that is arranged to cover the second InP-based cladding layer if the second masking layer that is shaped in accordance with the second pattern partially covers the unetched areas of the second InP-based cladding layer or said at least one protection layer that is arranged to cover the second InP-based cladding layer;
applying a second dry etch to:
  the second masking layer;
  the uncovered parts of the first etched areas of InP-based material; and
  the uncovered parts of the unetched areas of the second InP-based cladding layer or said at least one protection layer that is arranged to cover the second InP-based cladding layer if the second masking layer that is shaped in accordance with the second pattern partially covers the unetched areas of the second InP-based cladding layer or said at least one protection layer that is arranged to cover the second InP-based cladding layer;
for transferring the second pattern to at least the first InP-based cladding layer and said first part of the InP-based core layer, thereby obtaining:
  an etched second masking layer; and
  second etched areas of InP-based material at a second etch depth, d2, relative to the unetched areas of the second InP-based cladding layer or said at least one protection layer that is arranged to cover the second InP-based cladding layer, the second etch depth, d2, being larger than the first etch depth, d1.

\* \* \* \* \*